(12) United States Patent
Kwak et al.

(10) Patent No.: US 11,121,836 B2
(45) Date of Patent: Sep. 14, 2021

(54) METHOD FOR TRANSMITTING AND RECEIVING DATA IN WIRELESS COMMUNICATION SYSTEM AND DEVICE FOR SAME

(71) Applicant: LG Electronics Inc., Seoul (KR)

(72) Inventors: Kyuhwan Kwak, Seoul (KR); Daesung Hwang, Seoul (KR); Hyunho Lee, Seoul (KR); Yunjung Yi, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 36 days.

(21) Appl. No.: 16/477,816

(22) PCT Filed: Jan. 8, 2018

(86) PCT No.: PCT/KR2018/000366
§ 371 (c)(1),
(2) Date: Jul. 12, 2019

(87) PCT Pub. No.: WO2018/131857
PCT Pub. Date: Jul. 19, 2018

(65) Prior Publication Data
US 2020/0127783 A1    Apr. 23, 2020

Related U.S. Application Data

(60) Provisional application No. 62/544,224, filed on Aug. 11, 2017, provisional application No. 62/533,591, (Continued)

(51) Int. Cl.
*H04L 5/00* (2006.01)
*H04W 72/12* (2009.01)
*H04W 72/04* (2009.01)

(52) U.S. Cl.
CPC .......... *H04L 5/0048* (2013.01); *H04L 5/0007* (2013.01); *H04L 5/0044* (2013.01);
(Continued)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS

| | | | |
|---|---|---|---|
| 2018/0098337 A1* | 4/2018 | Lee | H04W 72/1278 |
| 2019/0150164 A1* | 5/2019 | Nam | H04L 1/0061 |
| | | | 370/329 |
| 2020/0136790 A1* | 4/2020 | Takeda | H04L 5/0082 |

OTHER PUBLICATIONS

Ericsson, "Design Aspects of sPDCCH", R1-1611512, 3GPP TSG RAN WG1 Meeting #87, Reno, USA, Nov. 4, 2016 (Year: 2016).*
(Continued)

*Primary Examiner* — Peter G Solinsky
*Assistant Examiner* — Sanjay K Dewan
(74) *Attorney, Agent, or Firm* — Fish & Richardson P.C.

(57) ABSTRACT

Disclosed are a method for transmitting and receiving data in a wireless communication system and a device therefor. Specifically, a method for transmitting and receiving, by a user equipment, data in a wireless communication system supporting a short transmission time interval (TTI) may include: receiving, through at least one of a physical downlink control channel (PDCCH) depending on a radio frame structure based on a first TTI or a short PDCCH (sPDCCH) based on a second TTI, downlink control information related to the second TTI, wherein the number of symbols corresponding to the second TTI is smaller than the number of
(Continued)

symbols corresponding to the first TTI; and receiving downlink data related to the second TTI through a short physical downlink shared channel (sPDSCH) depending on the radio frame structure based on the second TTI by using the downlink control information.

13 Claims, 15 Drawing Sheets

Related U.S. Application Data filed on Jul. 17, 2017, provisional application No. 62/501,725, filed on May 4, 2017, provisional application No. 62/479,304, filed on Mar. 30, 2017, provisional application No. 62/454,888, filed on Feb. 5, 2017, provisional application No. 62/445,721, filed on Jan. 12, 2017.

(52) U.S. Cl.
CPC ......... *H04L 5/0053* (2013.01); *H04W 72/042* (2013.01); *H04W 72/0446* (2013.01); *H04W 72/1289* (2013.01)

(58) Field of Classification Search
USPC .......................................................... 370/329
See application file for complete search history.

(56) References Cited

OTHER PUBLICATIONS

Huawei, et al., "Discussion on CRS Based sPDCCH", R1-1611156, 3GPP TSG RAN WG1, Meeting #87, Reno, USA, Nov. 5, 2016 (Year: 2016).*
ZTE et al., Discussion on sPDCCH for sTTI, R1-1611469, 3GPP TSG RAN WG1, Meeting #87, Reno, USA, Nov. 5, 2016. (Year: 2016).*
CATT, Other Issues for sPDCCH Design, R1-1611353, 3GPP TSG RAN WG1 Meeting #87, Reno, USA, Nov. 5, 2016. (Year: 2016 ).*
Intel Corporation, "On sPDCCH Design for shorten TTI", R1-1611947, 3GPP TSG RAN WG1 Meeting #87, Reno, USA, Nov. 6, 2016 (Year: 2016).*
Ericsson, "Design aspects of sPDCCH," R1-1611512, 3GPP TSG-RAN WG1 #87, Reno, USA, dated Nov. 4, 2016, 8 pages.
Huawei, HiSilicon, "Discussion on CRS based sPDCCH," R1-1611156, 3GPP TSG RAN WG1 Meeting #87, Reno, USA, dated Nov. 5, 2016, 9 pages.
ZTE, ZTE Microelectronics, "Discussion on sPDCCH for sTTI," R1-1611469, 3GPP TSG RAN WG1 Meeting #87, Reno, USA, dated Nov. 5, 2016, 9 pages.
CATT, "Other issues for sPDCCH design," R1-1611353, 3GPP TSG RAN WG1 Meeting #87, Reno, USA, dated Nov. 5, 2016, 5 pages.
Intel Corporation, "On sPDCCH design for shoten TTI," R1-1611947, 3GPP TSG-RAN WG1 #87, Reno, USA, dated Nov. 6, 2016, 7 pages.

* cited by examiner

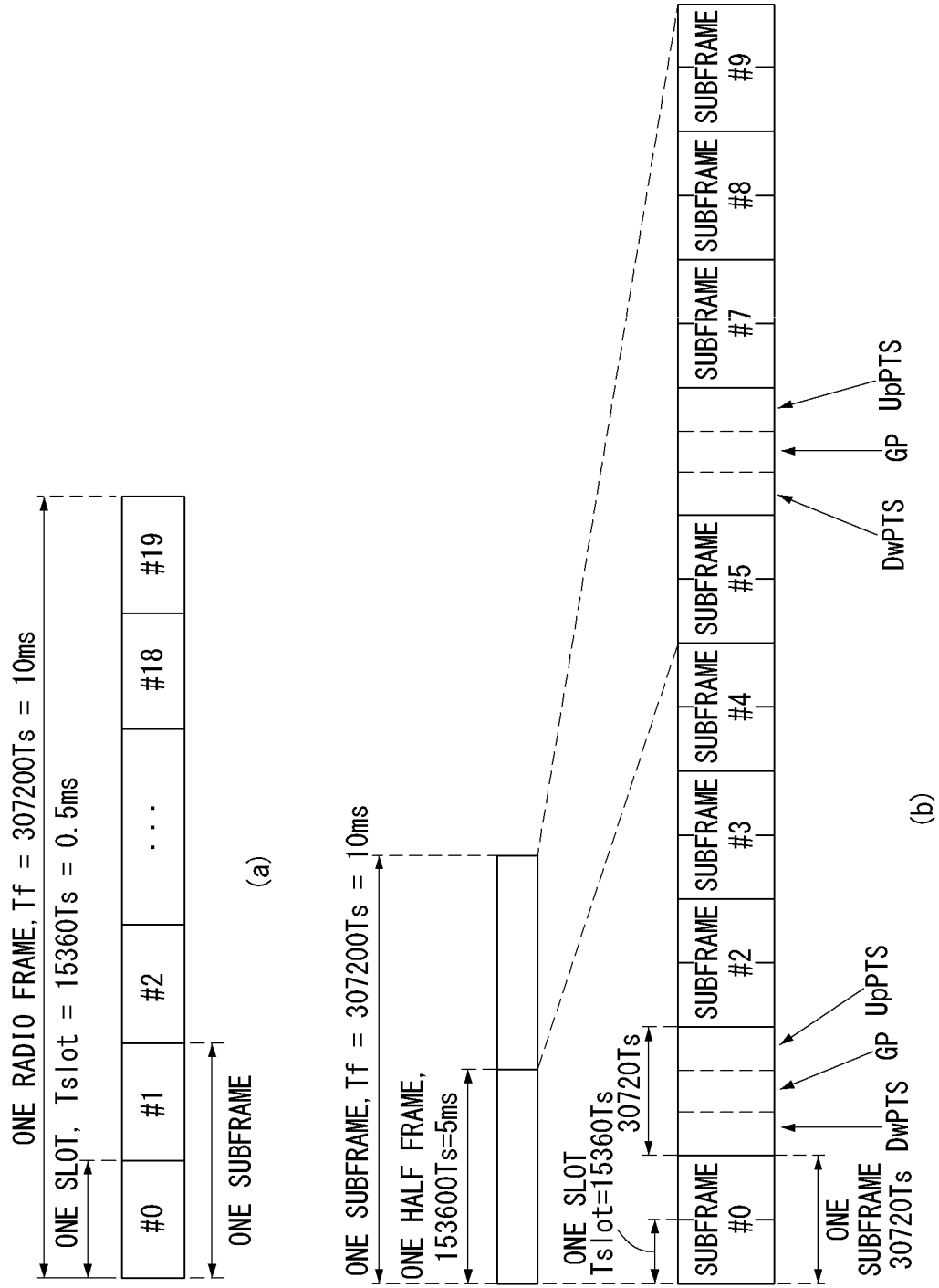
[FIG. 1]

[FIG. 2]
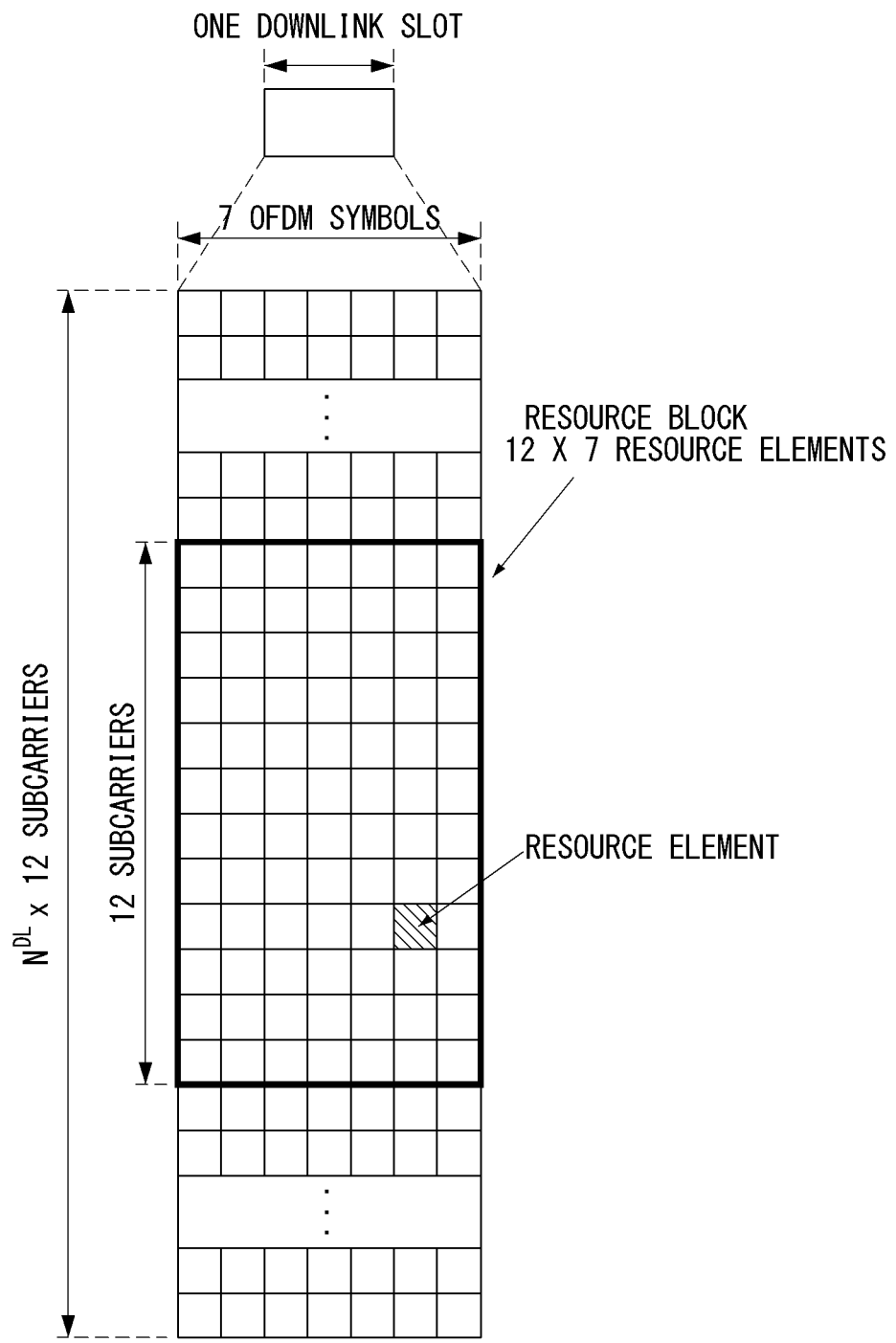

[FIG. 3]
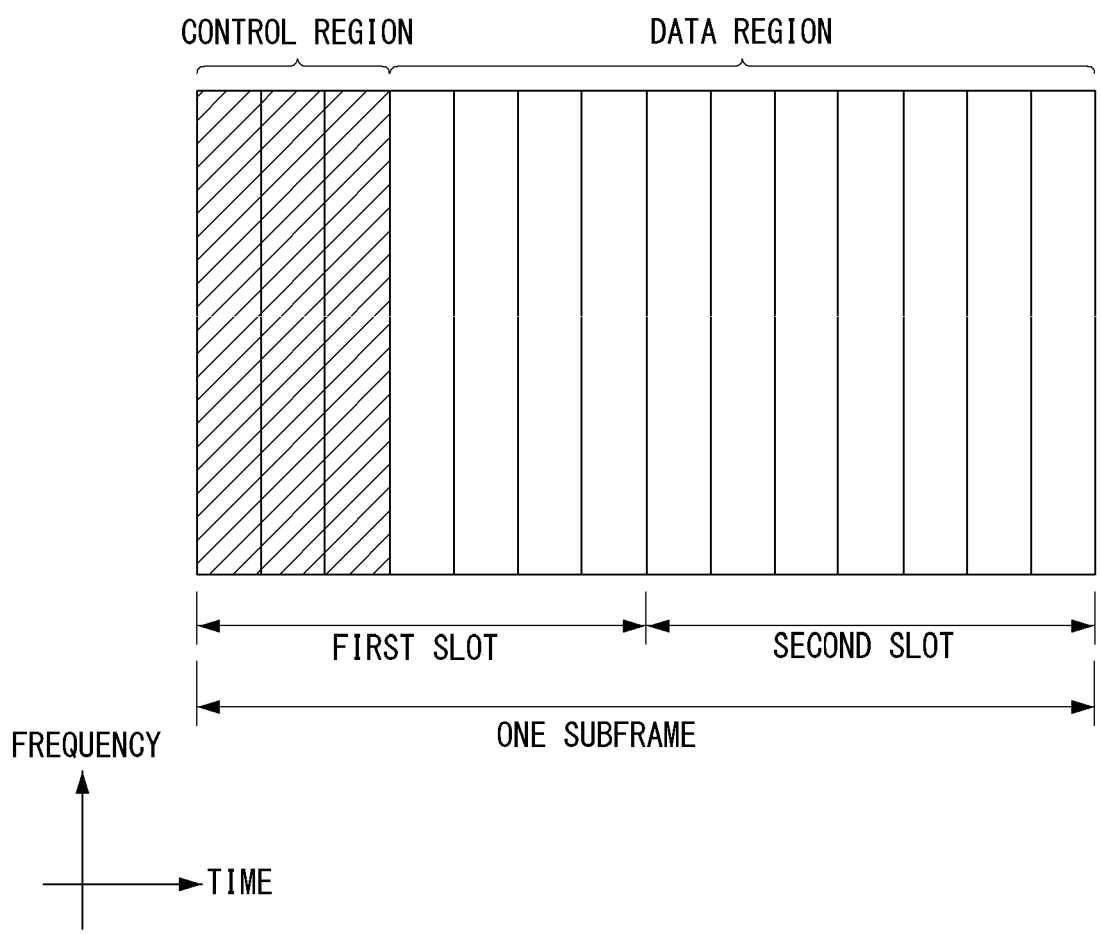

[FIG. 4]
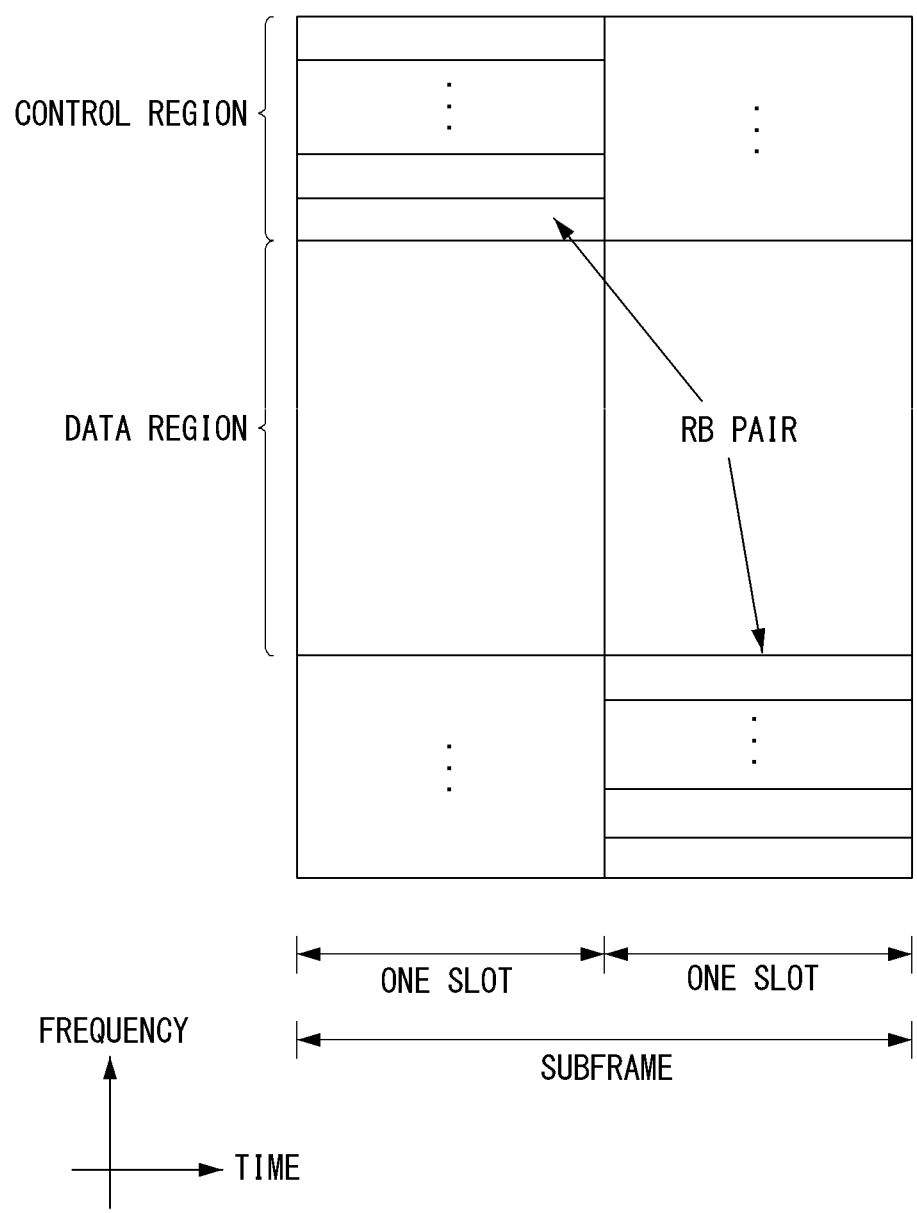

[FIG. 5]
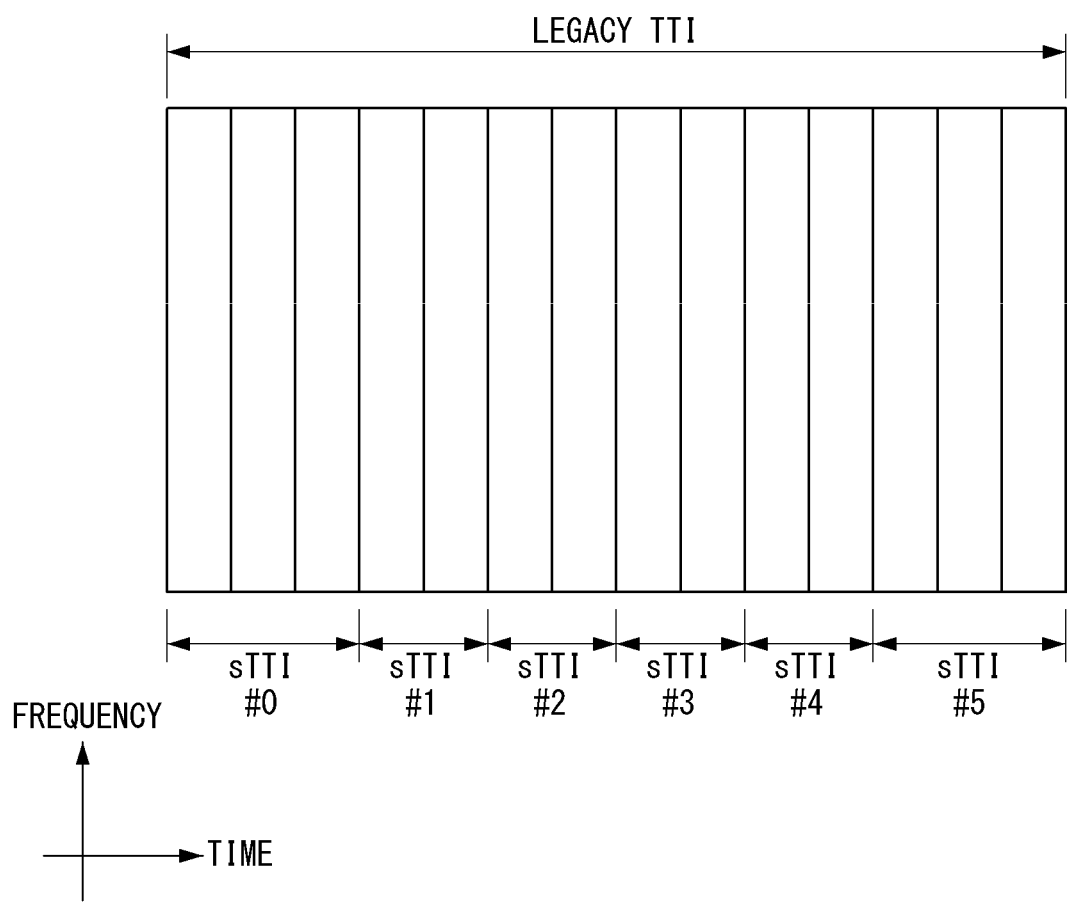

[FIG. 6]
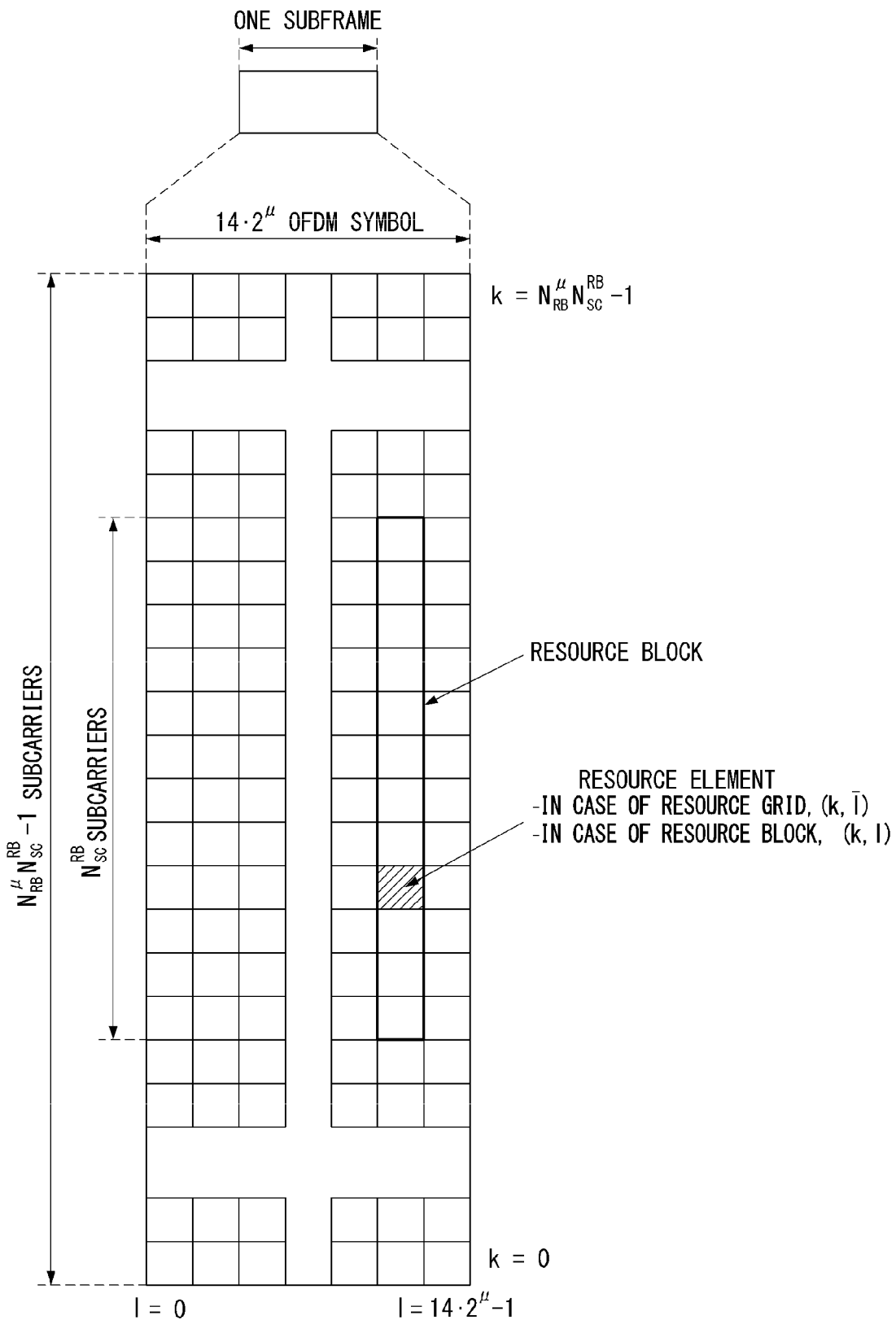

[FIG. 7]
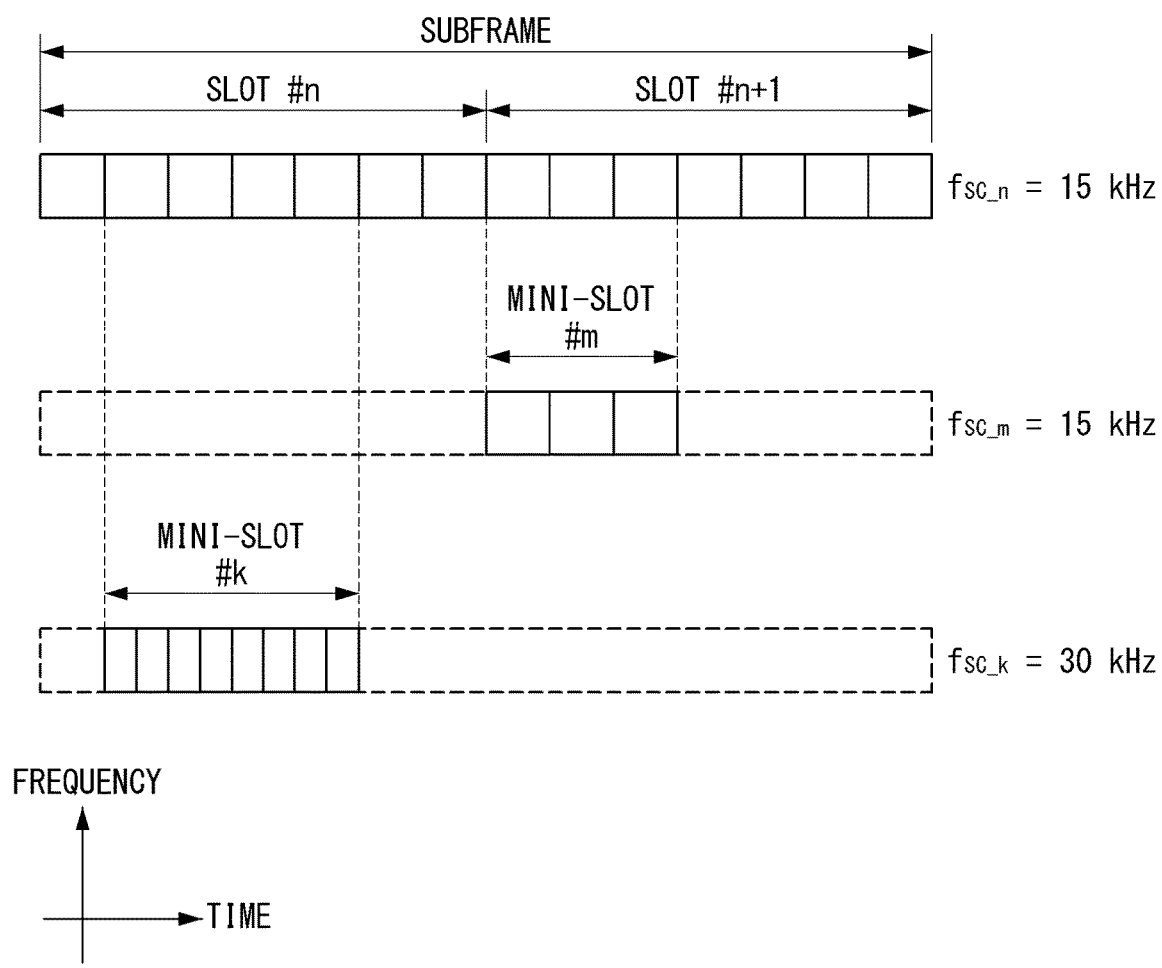

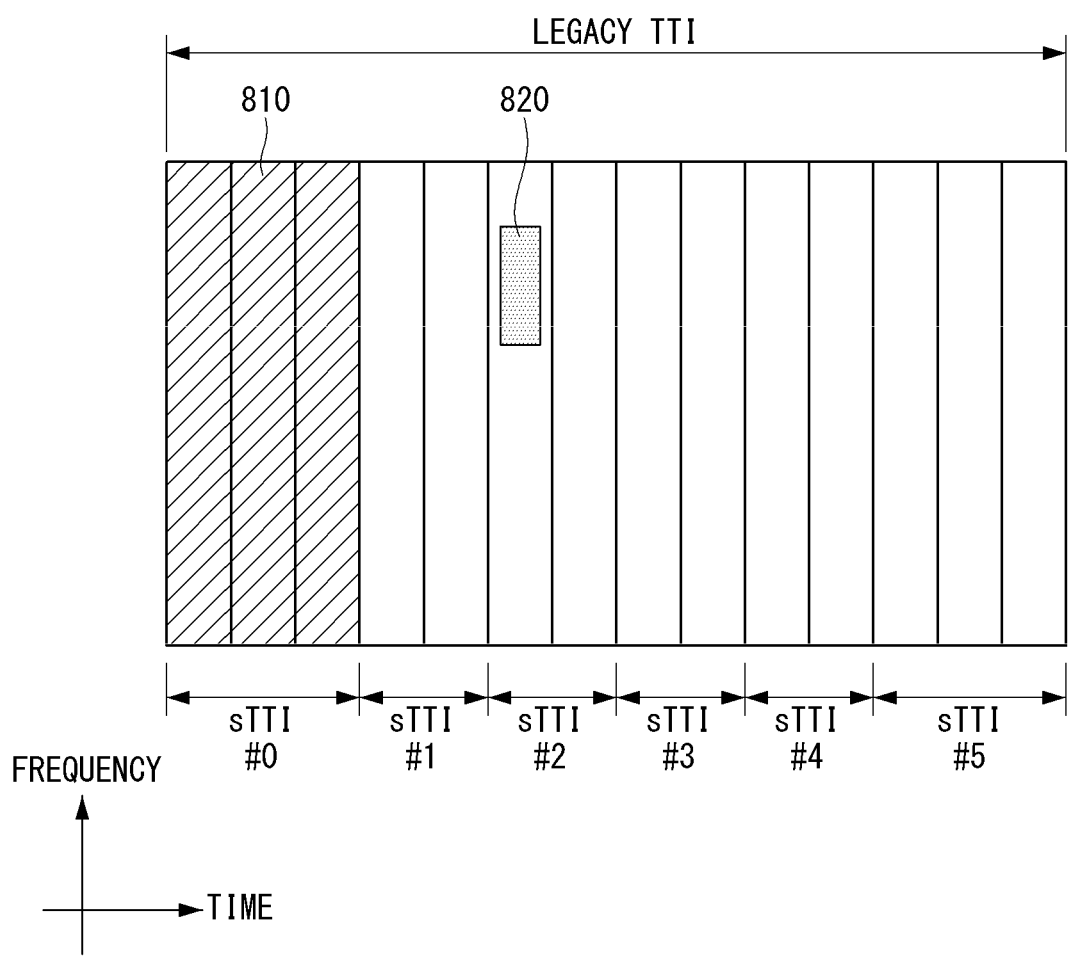
[FIG. 8]

[FIG. 9]
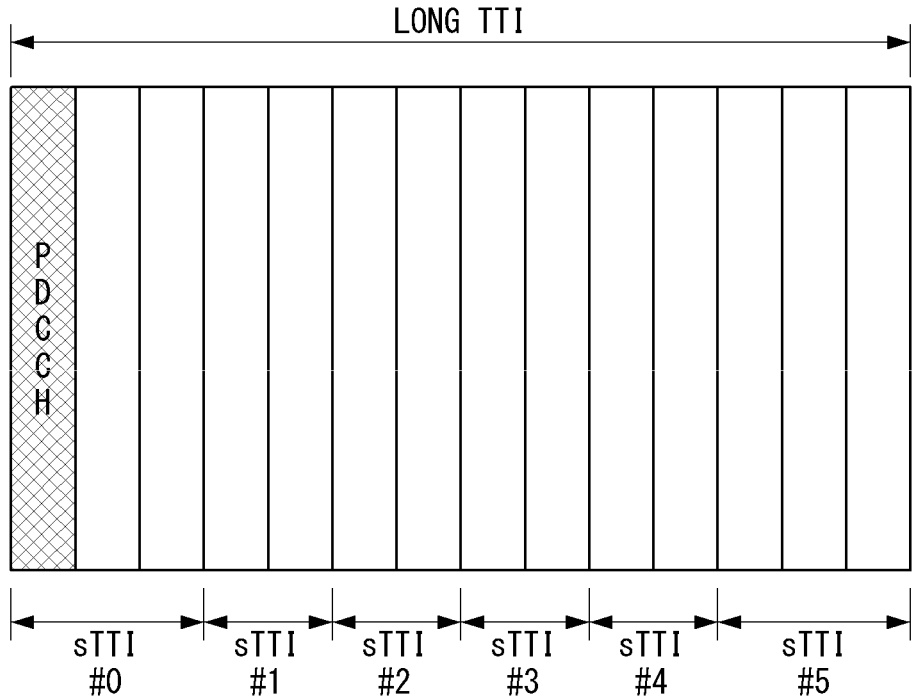
(a)
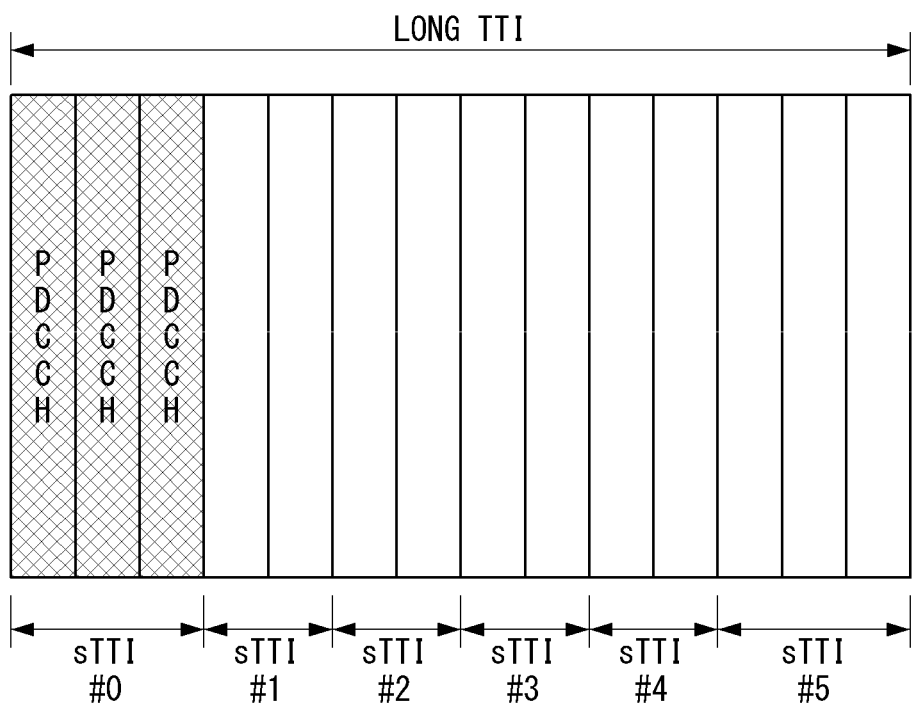
(b)

[FIG. 10]
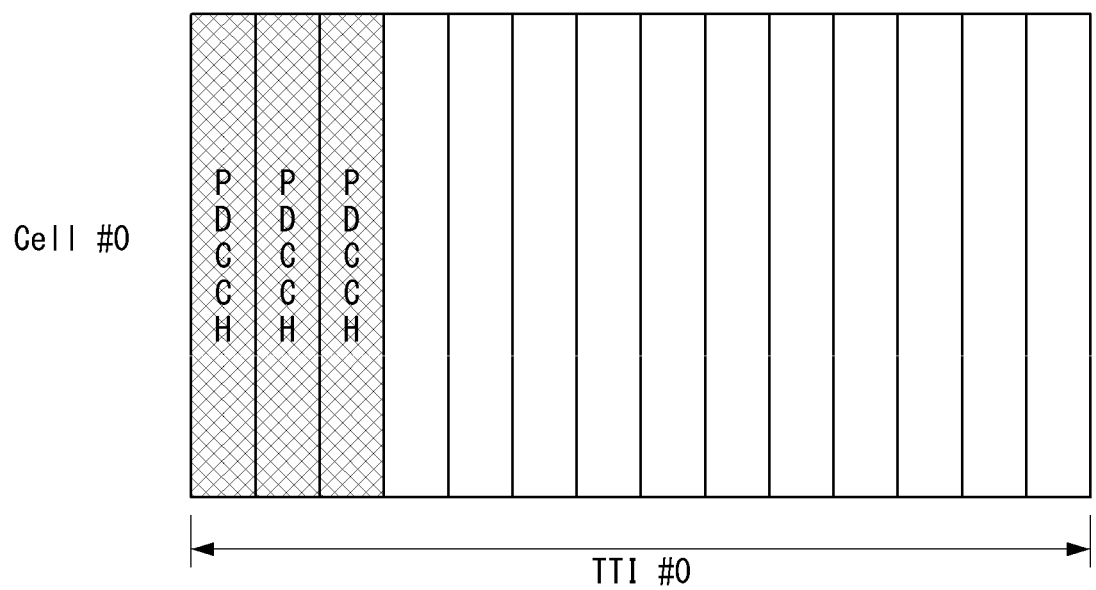
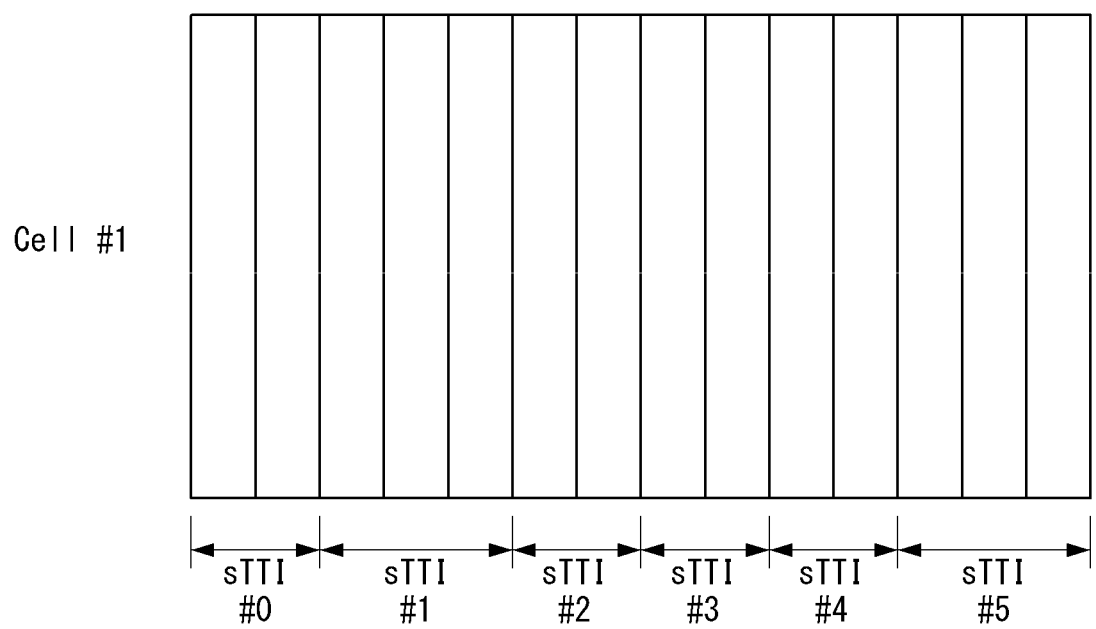

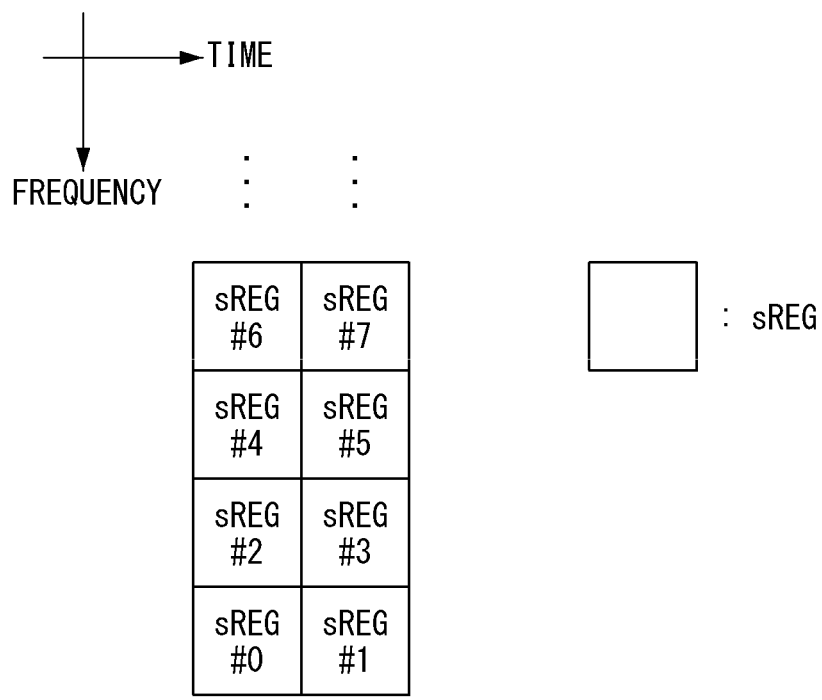
[FIG. 11]

[FIG. 12]
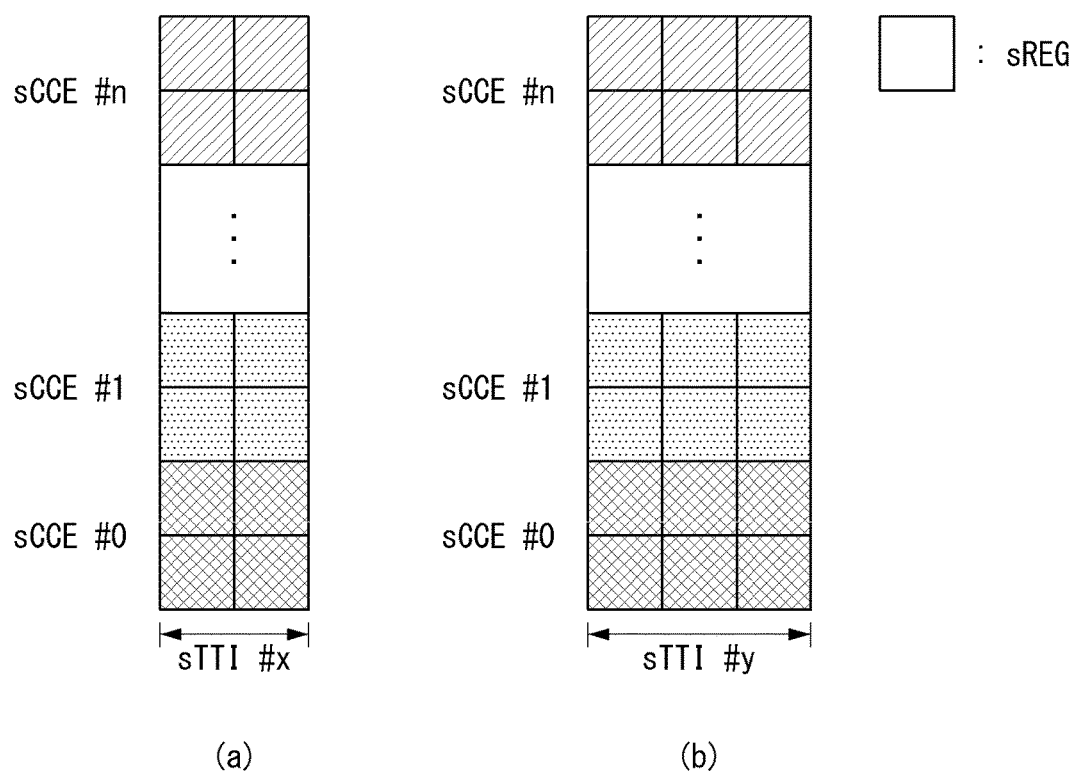

[FIG. 13]
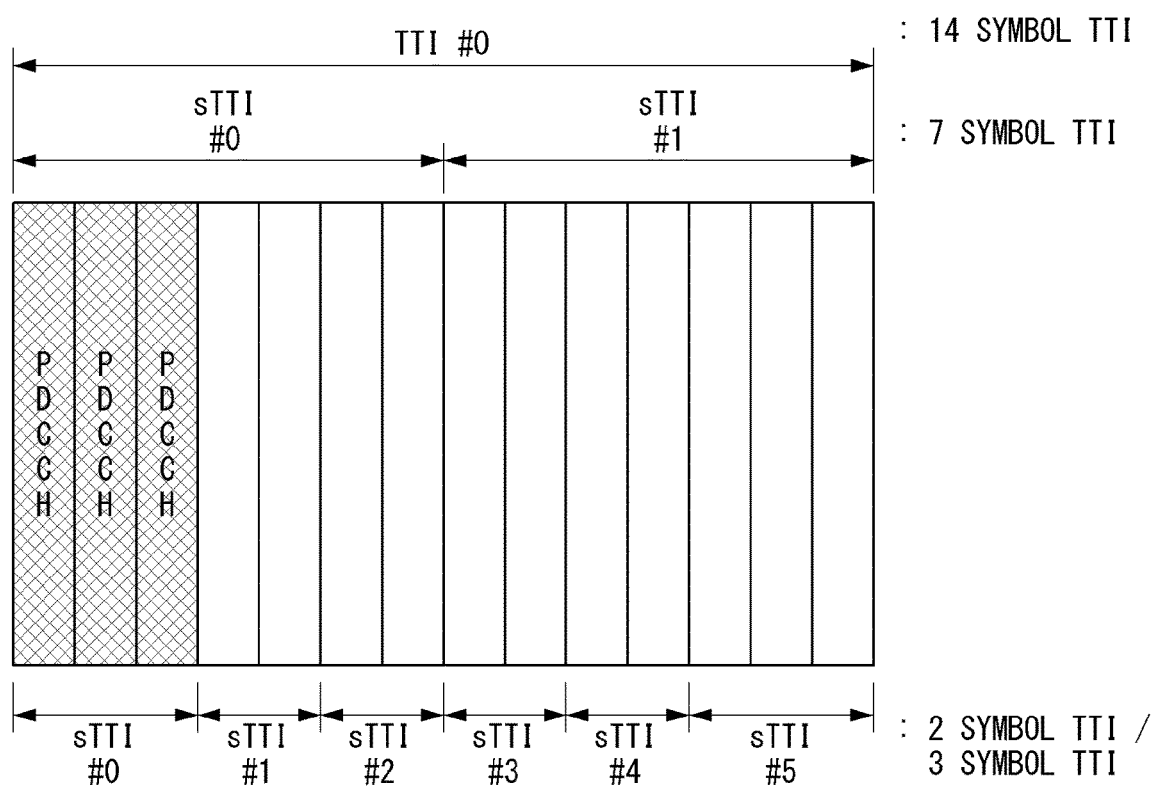

[FIG. 14]
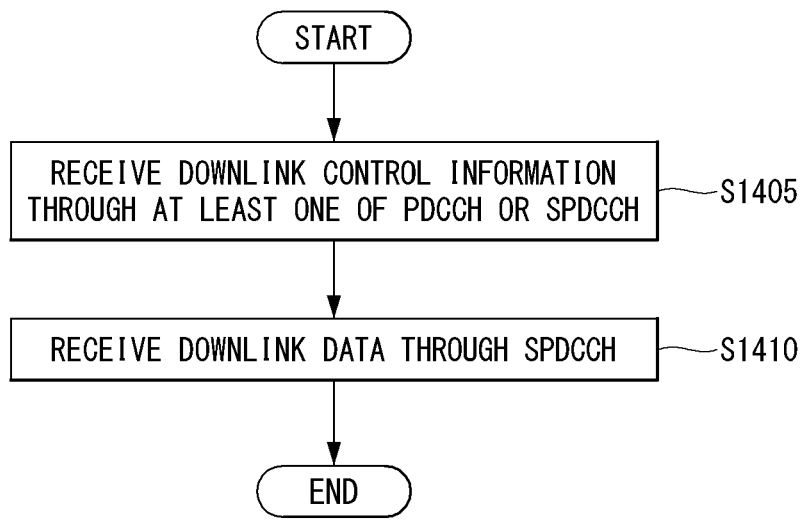
[FIG. 15]
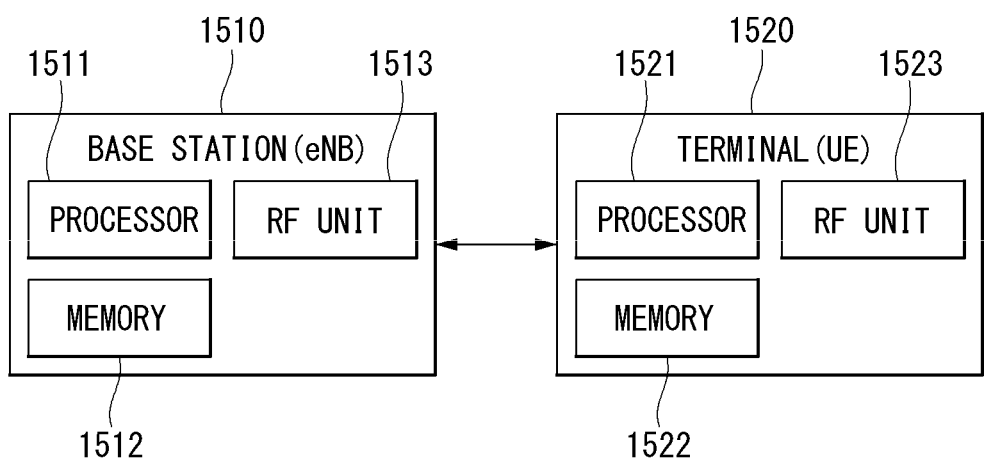

[FIG. 16]
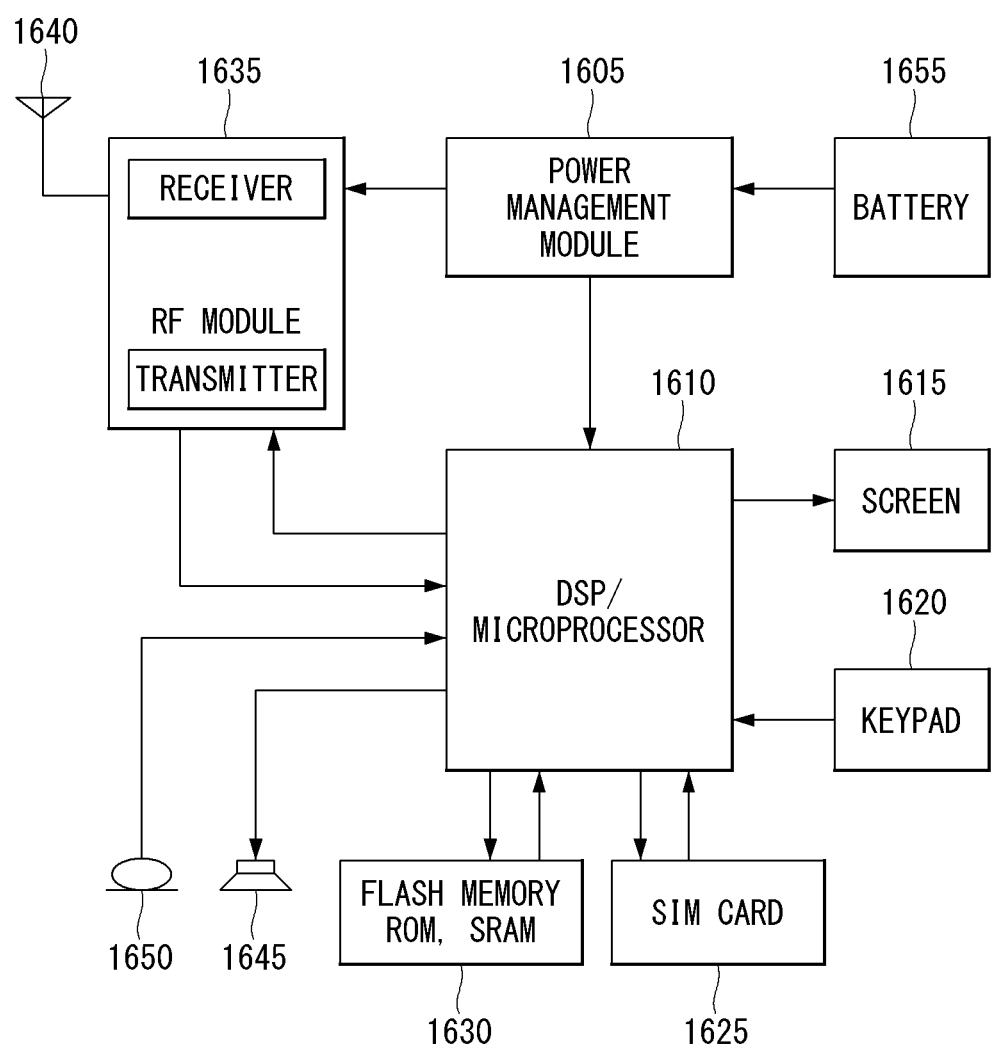

METHOD FOR TRANSMITTING AND RECEIVING DATA IN WIRELESS COMMUNICATION SYSTEM AND DEVICE FOR SAME

CROSS-REFERENCE TO RELATED APPLICATIONS

This application is a National Stage application under 35 U.S.C. § 371 of International Application No. PCT/KR2018/000366, filed on Jan. 8, 2018, which claims the benefit of U.S. Provisional Application No. 62/544,224, filed on Aug. 11, 2017, U.S. Provisional Application No. 62/533,591, filed on Jul. 17, 2017, U.S. Provisional Application No. 62/501,725, filed on May 4, 2017, U.S. Provisional Application No. 62/479,304, filed on Mar. 30, 2017, U.S. Provisional Application No. 62/454,888, filed on Feb. 5, 2017, and U.S. Provisional Application No. 62/445,721, filed on Jan. 12, 2017. The disclosures of the prior applications are incorporated by reference in their entirety.

TECHNICAL FIELD

The present invention relates to a wireless communication system, and more particularly, to a method for transmitting and receiving data and a device for supporting the same.

BACKGROUND ART

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high speed services, an advanced mobile communication system is required.

Requirements of a next-generation mobile communication system include accommodation of explosive data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

DISCLOSURE

Technical Problem

This specification proposes a method for transmitting and receiving data in a wireless communication system.

Specifically, this specification proposes a method for configuring a downlink control channel and/or a downlink shared channel.

In this regard, this specification proposes a method for configuring a downlink control channel and/or a downlink shared channel in a system (e.g., legacy TTI/short TTI, slot/mini-slot, etc.) in which transmission time intervals (TTIs) having different lengths coexist.

Further, this specification proposes a method for transmitting downlink control information for a short TTI in a system in which transmission time intervals (TTIs) having different lengths coexist.

The technical objects of the present invention are not limited to the aforementioned technical objects, and other technical objects, which are not mentioned above, will be apparently appreciated by a person having ordinary skill in the art from the following description.

Technical Solution

According to an embodiment of the present invention, a method for transmitting and receiving, by a user equipment, data in a wireless communication system supporting a short transmission time interval (TTI) includes: receiving, through at least one of a physical downlink control channel (PDCCH) depending on a radio frame structure based on a first TTI or a short PDCCH (sPDCCH) based on a second TTI, downlink control information related to the second TTI, wherein the number of symbols corresponding to the second TTI is smaller than the number of symbols corresponding to the first TTI; and receiving downlink data related to the second TTI through a short physical downlink shared channel (sPDSCH) depending on the radio frame structure based on the second TTI by using the downlink control information, in which the sPDCCH includes a control channel element corresponding to one or more resource element groups, and the number of one or more resource element groups is configured according to the number of symbols corresponding to the second TTI.

In addition, in the method according to an embodiment of the present invention, the one or more resource element groups may be disposed over at least one symbol corresponding to the second TTI.

In addition, in the method according to an embodiment of the present invention, a symbol length on a time domain of the control channel element may be configured to be equal to a symbol length corresponding to the second TTI.

Furthermore, in the method according to an embodiment of the present invention, the one or more resource element groups may be frequency division multiplexed and assigned in units of the number of symbols corresponding to the second TTI.

Furthermore, in the method according to an embodiment of the present invention, the one or more resource element groups may be mapped an increasing order of an index on the time domain and then, mapped in the increasing order of the index on a frequency domain.

Furthermore, in the method according to an embodiment of the present invention, the number of one or more resource element groups may be configured to a specific number of times of the number of symbols related to the second TTI. For example, when the number of symbols corresponding to the second TTI is 2, the number of one or more resource element groups may be configured to 4.

Furthermore, in the method according to an embodiment of the present invention, the number of one or more resource element groups may be configured to a specific number of times of the number of symbols corresponding to the second TTI.

In addition, in the method according to an embodiment of the present invention, when the resource region of the PDCCH exists in the resource region corresponding to the second TTI, the DCI may be received through the PDCCH.

Furthermore, in the method according to an embodiment of the present invention, the size of the downlink control information may be equal to the size of downlink control information related to the first TTI, and the downlink control information may include one or more zero padding bits added for matching with the size of the downlink control information related to the first TTI.

Furthermore, in the method according to an embodiment of the present invention, the downlink control information may include flag information indicating that the downlink control information is related to any one of the first TTI or the second TTI.

Furthermore, in the method according to an embodiment of the present invention, when the sPDCCH is received based on a cell-specific reference signal, the one or more resource element groups may be assigned to a specific symbol of at least one symbol corresponding to the second TTI.

Furthermore, in the method according to an embodiment of the present invention, the one or more resource element groups may be interleaved in the specific symbol.

Furthermore, in the method according to an embodiment of the present invention, the first TTI may be a TTI corresponding to 14 symbols, and the second TTI may be a TTI corresponding to any one of two symbols or three symbols.

According to an embodiment of the present invention, a user equipment (UE) for transmitting and receiving data in a wireless communication system supporting a short transmission time interval (TTI) includes: a Radio Frequency (RF) unit for transmitting and receiving a radio signal; and a processor functionally connected to the RF unit, in which the processor controls to receive, through at least one of a physical downlink control channel (PDCCH) depending on a radio frame structure based on a first TTI or a short PDCCH (sPDCCH) based on a second TTI, downlink control information related to the second TTI, wherein the number of symbols corresponding to the second TTI is smaller than the number of symbols corresponding to the first TTI, and receive downlink data related to the second TTI through a short physical downlink shared channel (sPDSCH) depending on the radio frame structure based on the second TTI by using the downlink control information, and the sPDCCH includes a control channel element corresponding to one or more resource element groups, and the number of one or more resource element groups is configured according to the number of symbols corresponding the second TTI.

Advantageous Effects

According to an embodiment of the present invention, even when TTIs having different lengths coexist, control information corresponding to a specific TTI can be forwarded through a control region corresponding to a different TTI length or a control region of a corresponding TTI.

In particular, according to an embodiment of the present invention, in forwarding control information of a TTI to which a small number of symbols are allocated, control overhead and/or the number of blind decoding times of an additional UE can be reduced.

Advantages which can be obtained in the present invention are not limited to the aforementioned effects and other unmentioned advantages will be clearly understood by those skilled in the art from the following description.

DESCRIPTION OF DRAWINGS

The accompanying drawings, which are included to provide a further understanding of the invention, illustrate embodiments of the invention and together with the description serve to explain the principle of the invention.

FIG. 1 is a view illustrating a structure a radio frame in a wireless communication system to which the present invention can be applied.

FIG. 2 is a view illustrating a resource grid for one downlink slot in a wireless communication system to which the present invention can be applied.

FIG. 3 is a view illustrating a structure of a downlink subframe in a wireless communication system to which the present invention can be applied.

FIG. 4 is a view illustrating a structure of an uplink subframe in a wireless communication system to which the present invention can be applied.

FIG. 5 illustrates an example of a short transmission time interval (TTI) based radio frame structure to which a method proposed by this specification can be applied.

FIG. 6 illustrates an example of a resource grid supported by an NR system to which a method proposed by this specification may be applied.

FIG. 7 illustrates an example of a radio frame structure in an NR system to which a method proposed by this specification can be applied.

FIG. 8 illustrates an example of a method for performing two-level downlink control information (DCI) transmission to which a method proposed by this specification can be applied.

FIG. 9 illustrates examples of a radio frame structure when TTIs having different lengths coexist, to which a method proposed by this specification can be applied.

FIG. 10 illustrates an example of a structure in which lengths of inter-cell TTIs performing cross-carrier scheduling are configured different from each other, to which a method proposed by this specification can be applied.

FIG. 11 illustrates an example of an sREG configuration to which a method proposed in this specification can be applied.

FIG. 12 illustrates examples of an sCCE configuration to which a method proposed by this specification can be applied.

FIG. 13 illustrates another example of a radio frame structure when TTIs having different lengths coexist, to which a method proposed by this specification can be applied.

FIG. 14 illustrates an operational flowchart of a UE transmitting and receiving data in a wireless communication system supporting a short transmission time interval to which a method proposed by this specification can be applied.

FIG. 15 illustrates a block diagram of a wireless communication device to which methods proposed by this specification can be applied.

FIG. 16 illustrates a block diagram of a communication device according to an embodiment of the present invention.

MODE FOR INVENTION

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

Overview of LTE System

FIG. 1 illustrates a structure of a radio frame in a wireless communication system to which the present invention can be applied.

A 3GPP LTE/LTE-A supports radio frame structure type 1 applicable to frequency division duplex (FDD) and radio frame structure type 2 applicable to time division duplex (TDD).

In FIG. 1, the size of the radio frame in the time domain is represented by a multiple of a time unit of $T\_s=1/(15000*2048)$. The downlink and uplink transmissions are configured by a radio frame having an interval of $T\_f=307200*T\_s=10$ ms.

FIG. 1(a) above illustrates the structure of radio frame type 1. Radio frame type 1 may be applied to both full duplex and half duplex FDDs.

The radio frame is constituted by 10 subframes. One radio frame is constituted by 20 slots having a length of $T\_slot=15360*T\_s=0.5$ ms and indexes of 0 to 19 are granted to each slot. One subframe is constituted by two consecutive slots in the time domain and subframe i is constituted by slot 2i and slot 2i+1. A time required for transmitting one subframe is referred to as a transmission time interval (TTI). For example, a length of one subframe may be 1 ms and the length of one slot may be 0.5 ms.

In the FDD, the uplink transmission and the downlink transmission are classified in the frequency domain. There is no limit in the full duplex FDD, while in a half duplex FDD operation, the UE may not perform transmission and reception simultaneously.

One slot includes a plurality of orthogonal frequency division multiplexing (OFDM) symbols in the time domain and includes multiple resource blocks (RBs) in the frequency domain. Since the 3GPP LTE uses OFDMA in the downlink, the OFDM symbol is intended to represent one symbol period. The OFDM symbol may be referred to as one SC-FDMA symbol or symbol period. A resource block as a resource allocation unit includes a plurality of consecutive subcarriers in one slot.

FIG. 1(b) illustrates frame structure type 2. Radio frame type 2 is constituted by two half frames each having a length of $153600*T\_s=5$ ms. Each half frame is constituted by 5 subframes having a length of $30720*T\_s=1$ ms.

In frame structure type 2 of the TDD system, an uplink-downlink configuration is a rule indicating whether the uplink and the downlink are assigned (or reserved) for all subframes.

Table 1 shows an uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each subframe of the radio frame, 'D' denotes a subframe for the downlink transmission, 'U' denotes a subframe for the uplink transmission, 'S' denotes a special subframe constituted by three fields, i.e., a downlink pilot time slot (DwPTS), a guard period (GP), and an uplink pilot time slot (UpPTS).

The DwPTS is used for initial cell search, synchronization, or channel estimation in the UE. The UpPTS is used to match the channel estimation at the base station and uplink transmission synchronization of the UE. The GP is a period for eliminating interference caused in the uplink due to a multi-path delay of a downlink signal between the uplink and the downlink.

Each subframe i is constituted by slot 2i and slot 2i+1 each having a length of $T\_slot=15360*T\_s=0.5$ ms.

The uplink-downlink configuration may be divided into 7 types and locations and/or the numbers of downlink subframes, special subframes, and uplink subframes vary for each configuration.

A point when the downlink is changed to the uplink or a point when the uplink is switched to the downlink is referred to as a switching point. Switch-point periodicity of the switching point means a period in which an aspect in which the uplink subframe and the downlink subframe are switched is similarly repeated and both 5 ms and 10 ms are supported. When the downlink-downlink switch-point periodicity is 5 ms, the special subframe S exists for each half-frame and when the downlink-uplink switch-point periodicity is 5 ms, the special subframe S exists only in a first half-frame.

In all configurations, subframes #0 and #5 and the DwPTS are periods only for the downlink transmission. The UpPTS and a subframe immediately following the subframe are always periods for the uplink transmission.

The uplink-downlink configuration as system information may be known by both the base station and the UE. The eNB transmits only an index of configuration information whenever the configuration information is changed to notify the UE of a change of an uplink-downlink assignment state of the radio frame. Further, the configuration information as a kind of downlink control information may be transmitted through a physical downlink control channel (PDCCH) similar to another scheduling information and the configuration information as broadcast information may be commonly transmitted to all UEs in a cell through a broadcast channel.

Table 2 shows a configuration (the length of DwPTS/GP/UpPTS) of the special subframe.

The structure of the radio frame according to the example of FIG. 1 is merely an example and the number of subcarriers included in the radio frame or the number of slots included in the subframe, and the number of OFDM symbols included in the slot may be variously changed.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, $N^{DL}$ is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of

TABLE 2

| | | Normal cyclic prefix in downlink | | | Extended cyclic prefix in downlink | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — | a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

The enhanced PDCCH (EPDCCH) carries UE-specific signaling. The EPDCCH is located in a physical resource block (PRB) that is configured to be UE specific. In other words, as described above, the PDCCH may be transmitted in up to three OFDM symbols in the first slot in the subframe, but the EPDCCH can be transmitted in a resource region other than the PDCCH. The time (i.e., symbol) at which the EPDCCH starts in the subframe may be configured in the UE via higher layer signaling (e.g., RRC signaling, etc.).

The EPDCCH may carry a transport format, resource allocation, and HARQ information associated with DL-SCH, a transport format, resource allocation, and HARQ information associated with UL-SCH, resource allocation information associated with Sidelink Shared Channel (SL-SCH) and Physical Sidelink Control Channel (PSCCH), etc. Multiple EPDCCHs may be supported and the UE may monitor the set of EPCCHs.

The EPDCCH may be transmitted using one or more successive enhanced CCEs (ECCEs) and the number of ECCEs per EPDCCH may be determined for each EPDCCH format.

Each ECCE may be constituted by a plurality of enhanced resource element groups (EREGs). The EREG is used for defining mapping of the ECCE to the RE. There are 16 EREGs per PRB pair. All REs are numbered from 0 to 15 in the order in which the next time increases in the order in which the frequency increases, except for the RE carrying the DMRS in each PRB pair.

The UE may monitor a plurality of EPDCCHs. For example, one or two EPDCCH sets may be configured in one PRB pair in which the UE monitors EPDCCH transmission.

Different coding rates may be implemented for the EPCCH by merging different numbers of ECCEs. The EPCCH may use localized transmission or distributed transmission, and as a result, the mapping of the ECCE to the RE in the PRB may vary.

FIG. 4 illustrates a structure of an uplink subframe in a wireless communication system to which the present invention can be applied.

Referring to FIG. 4, the uplink subframe may be divided into the control region and the data region in the frequency domain. A physical uplink control channel (PUCCH) carrying the uplink control information is allocated to the control region. A physical uplink shared channel (PUSCH) carrying the user data is allocated to the data region. In order to maintain a single carrier characteristic, one UE does not transmit the PUCCH and the PUSCH at the same time.

A resource block pair within the subframe is allocated to the PUCCH for one UE. RBs belonging to the RB pair occupy different subcarriers in each of two slots. In this case, the RB pair allocated to the PUCCH frequency-hops in a slot boundary.

Short Transmission Time Interval (sTTI)

In a next-generation communication system, a scheme for achieving a very short latency time when transmitting and receiving information is considered. To this end, a structure of shortening a transmission time interval (TTI) may be considered and in this case, a channel for transmitting and receiving data and control information needs to be newly designed.

A TTI which is configured shorter than the existing TTI (i.e., one subframe (1 ms)) may be referred to as the short transmission time interval (sTTI). Hereinafter, in this specification, the sTTI may be appreciated as the same meaning as one short TTI subframe (or short subframe).

As an example, the sTTI may be configured by OFDM symbol unit (e.g., 2 symbol sTTI, 3 symbol sTTI, and 7 symbol sTTI) and configured to be aligned on a boundary of the existing TTI.

Control and data channels related to the sTTI may be expressed in a form in which 's-' is added to a channel used in legacy LTE. For example, a physical downlink control channel may be expressed as sPDCCH, a physical downlink data channel may be expressed as sPDSCH, a physical uplink control channel may be expressed as sPUCCH, and a physical uplink data channel may be expressed as sPUSCH.

FIG. 5 illustrates an example of a short transmission time interval (TTI) based radio frame structure to which a method proposed by this specification can be applied. FIG. 5 is just for convenience of the description and does not limit the scope of the present invention.

Referring to FIG. 5, six sTTIs (i.e., four 2 symbol sTTIs and two 3 symbol sTTIs) may be aligned according to the existing legacy TTI (i.e., 14 OFDM symbols). That is, with respect to 14 OFDM symbols, STTIs may be disposed in a scheme of dms 3(sTTI #0)-2(sTTI #1)-2(sTTI #2)-2(sTTI #3)-2(sTTI #4)-3(sTTI #5). However, an alignment method of the sTTIs is not limited thereto and may be configured by various combinations using sTTIs constituted by various symbol numbers.

In this case, downlink control information (DCI) for each sTTI may be configured to be forwarded through the short PDCCH (sPDCCH) configured for each sTTI. Alternatively, in the case of some sTTIs (e.g., sTTI disposed at the beginning based on the legacy TTI), the DCI for the corresponding sTTI may be forwarded through not the sPDCCH but the existing PDCCH area (i.e., a maximum of three OFDM symbols before the legacy TTI).

Overview of NR System

As propagation of smart phones and Internet of things (IoT) terminals rapidly spreads, the amount of information which is transmitted and received through a communication network increases. Accordingly, in the next generation wireless access technology, an environment (e.g., enhanced mobile broadband communication) that provides a faster service to more users than existing communication systems (or existing radio access technology) needs to be considered.

To this end, a design of a communication system that considers machine type communication (MTC) providing a service by connecting multiple devices and objects is discussed. Further, a design of a communication system (e.g., Ultra-Reliable and Low Latency Communication (URLLC)) considering a service and/or a terminal sensitive to reliability and/or latency of communication is also discussed.

Hereinafter, in this specification, for easy description, the next-generation wireless access technology is referred to as a new radio access technology (RAT) (NR) and the wireless communication system to which the NR is applied is referred to as an NR system.

FIG. 6 illustrates an example of a resource grid supported by an NR system to which a method proposed by this specification may be applied.

Referring to FIG. 6, it is exemplarily described that the resource grid is constituted by $N_{RB}^{\mu} N_{sc}^{RB}$ subcarriers on a frequency domain and one subframe is constituted by $14 \cdot 2^{\mu}$ OFDM symbols, but the present invention is not limited thereto.

In the NR system, a transmitted signal is described by one or more resource grids constituted by $N_{RB}^{\mu} N_{sc}^{RB}$ subcarriers and $2^{\mu} N_{symb}^{(\mu)}$ OFDM symbols. Here, $N_{RB}^{\mu} \leq N_{RB}^{max,\mu}$. The $N_{RB}^{max,\mu}$ may represent a maximum transmission bandwidth and may vary between uplink and downlink as well as numerologies.

FIG. 7 illustrates an example of a radio frame structure in an NR system to which a method proposed by this specification can be applied. FIG. 7 is just for convenience of the description and does not limit the scope of the present invention.

Referring to FIG. 7, it is assumed that a reference subcarrier spacing (i.e., reference $f_{sc}$) is configured to 15 kHz (i.e., $f_{sc}$=15 kHz) and one subframe is constituted by two slots (slot #n and slot #n+1). In this case, the number of OFDM symbols constituting the slot in the case of FIG. 7 is configured to 7, but the present invention is not limited thereto. The number of OFDM symbols may be changed according to the number of symbols constituting the subframe or configured through signaling. As an example, the number of symbols constituting the slot may be configured equal to the number of symbols constituting the subframe.

In addition, in the NR system, a scheme of introducing a 'mini-slot' is being considered in order to utilize resources more efficiently and to reduce the time delay required for data transmission and reception. Here, the mini-slot may mean a transmission unit configured to support transmission that is shorter than the length of the slot.

In this case, the length (i.e., the number of OFDM symbols constituting the mini-slot) of the mini-slot, the position of the mini-slot, and the like may be configured flexibly. For example, a starting symbol of the mini-slot may be configured to be placed at a beginning point of a specific slot (e.g., mini-slot #m) or configured to be placed at a midpoint of a specific slot (e.g., mini-slot #k).

Further, the subcarrier spacing applied to the mini-slot may be configured equal to or different from the subcarrier spacing applied to the slot (and/or the subframe). For example, if the subcarrier spacing for the slot is configured to 15 kHz ($f_{sc\_n}$=15 kHz), the subcarrier spacing for mini-slot #m may equally be configured to 15 kHz ($f_{sc\_m}$=15 kHz). Alternatively, if the subcarrier spacing for the slot is configured to 15 kHz ($f_{sc\_n}$=15 kHz), the subcarrier spacing for mini-slot #k may be configured to 30 kHz ($f_{sc\_k}$=30 kHz).

As described above, in the next-generation communication system, a structure in which the transmission time interval (TTI) is configured to be short may be considered in order to reduce a delay time that may occur when information is transmitted/received.

In the case of a legacy LTE system, one or more symbols (e.g., three symbols) arranged in a front part of a subframe having a length of 1 ms are configured as a PDCCH and the eNB transmits the DCI to the UE over the PDCCH configured as above. When the eNB transmits the DCI over the PDCCH, a plurality of aggregation levels (AL) may be configured so that one or more control channel elements may be aggregated according to a channel state. Here, the aggregation level may mean the number of consecutive CCEs required for forwarding one PDCCH.

When a structure having a TTI (i.e., sTTI) shorter than 1 ms (i.e., a legacy TTI) is additionally introduced in such a legacy LTE system, a method for transmitting downlink control channel information (e.g., DCI) related to sTTI unit transmission needs to be discussed.

As an example, a method for forwarding DCI (i.e., means DCI for sTTI and may be expressed as short DCI (sDCI)) for scheduling the sTTI at two levels may be considered in order to efficiently transmit and receive the downlink control information (DCI) between the eNB and the UE.

This may mean a method for transmitting the DCI for the sTTI using the PDCCH and the sPDCCH when the legacy LTE system and the system supporting the sTTI coexist. That is, the DCI for the sTTI may be divided and forwarded to the DCI forwarded via the PDCCH and the DCI forwarded over the sPDCCH. Hereinafter, for convenience of the description, the DCI forwarded over the PDCCH is referred to as 'slow DCI' and the DCI forwarded via the sPDCCH is referred to as 'fast DCI'.

FIG. 8 illustrates an example of a method for performing two-level downlink control information (DCI) transmission to which a method proposed by this specification can be applied. FIG. 8 is just for convenience of the description and does not limit the scope of the present invention.

Referring to FIG. 8, an area 810 may represent a PDCCH transmission area configured for the legacy TTI (i.e., the legacy LTE system) and an area 820 may represent an sPDCCH transmission area configured for sTTI #2. In this case, the area 810 is constituted by three symbols, but the PDCCH may be transmitted by using a maximum of three symbols (i.e., may be transmitted by using only one symbol). Further, the area 820 is illustrated as being located in a first symbol of sTTI #2, but is not limited thereto and may exist over two symbols or may be located in a second symbol.

In this case, the eNB may use both the PDCCH forwarded via the area 810 and the sPDCCH forwarded via the area 820 in order to forward DCI (e.g., DCI for sPDSCH scheduling of sTTI #2) for sTTI #2. That is, the eNB may forward some (i.e., the slow DCI) of the DCI for sTTI #2 over the area 810 and the rest (i.e., the fast DCI) over the area 820.

As described above, in a case where the DCI (e.g., DCI contents for sPDSCH scheduling) for one sTTI is divided into two DCIs and transmitted, overhead related to control signaling may be reduced as compared with a case of transmitting the DCI at a single level.

Hereinafter, in this specification, in relation to a method for performing transmission of the DCI (i.e., sDCI) for the sTTI, a method for performing scheduling (e.g., resource scheduling, cross-carrier scheduling, etc.), a method for configuring a downlink control channel, a method for transmitting the DCI, a method for reporting channel state information, and the like will be described in detail.

The scheme described in this specification is not limited only to the two-level DCI transmission and may be applied even to a case where the DCI for scheduling the sTTI is transmitted over any one of the PDCCH (i.e., legacy PDCCH) or the sPDCCH (i.e., a case of single-level DCI transmission), of course.

Further, hereinafter, embodiments proposed by this specification will be described by assuming a case where the legacy LTE system and the system supporting the sTTI coexist for convenience of the description. However, the embodiments are not limited thereto and may be applied to a case of sharing by systems having TTIs having different lengths. As an example, the present invention may also be similarly applied to a case where the slot considered in the NR system and the mini-slot (i.e., a transmission unit having a shorter than the slot) (e.g., FIG. 7) coexist. In this case, the legacy TTI may correspond to the slot (or subframe) and the sTTI may correspond to the mini-slot having the transmission unit configured relatively smaller than that of the slot.

Further, hereinafter, the embodiments described in this specification are just distinguished for convenience of the description and some configurations or features of a predetermined embodiment may be included in other embodiments or may be replaced with corresponding configurations or features of other embodiments. For example, hereinafter, a scheme to be described in a third embodiment may be applied to schemes to be described in other embodiments and vice versa.

First Embodiment—Resource Scheduling Method

First, in the first embodiment, a method for scheduling resources when systems (or radio frame structures) having TTIs with different lengths coexist will be described. Specifically, this specification proposes a method for forwarding the DCI and/or the sDCI (i.e., DCI for scheduling the STTI) over the PDCCH and/or the sPDCCH.

FIG. 9 illustrates examples of a radio frame structure when TTIs having different lengths coexist, to which a method proposed by this specification can be applied. FIG. 9 is just for convenience of the description and does not limit the scope of the present invention.

FIG. 9(*a*) illustrates a case where the PDCCH region (i.e., PDCCH resource region) is constituted by one symbol when TTIs (e.g., 2 symbol TTI, 3 symbol TTI, and 14 symbol TTI (i.e., legacy TTI)) coexist. That is, it is assumed that a subframe having a long TTI (e.g., legacy TTI) is configured by a total of 14 symbols and a downlink control channel region (i.e., PDCCH region) is configured by one symbol.

Unlike this, FIG. 9(*b*) illustrates a case where the PDCCH region is constituted by three symbols when TTIs having different lengths coexist. That is, it is assumed that the subframe having the long TTI (e.g., legacy TTI) is configured by a total of 14 symbols and the PDCCH region is configured by three symbols.

In this case, in FIG. 9, an sPDCCH region which is a control channel region for the sTTI is illustrated, but the sPDCCH region for each sTTI may be configured in a specific region in the symbol(s) constituting the sTTI. As an example, the sPDCCH region for each sTTI may be configured over one or more symbols based on a reference signal, such as a demodulation reference signal (DMRS) or a cell-specific reference signal (CRS). Alternatively, the sPDCCH region may not be configured for a specific sTTI and the sPDCCH region may be configured only for the remaining sTTIs.

First, a scheduling method for the sTTI which may be considered in the case of the structure of FIG. 9(*a*) will be described.

For example, the eNB may configure the sPDCCH region every sTTI and perform scheduling for each sTTI over each sPDCCH. In this case, scheduling for the long TTI may be configured to be performed via the PDCCH region. Therefore, the eNB may not perform scheduling between TTIs having different units (i.e., lengths). As a specific example, when the sTTI (i.e., 2 symbol TTI or 3 symbol TTI which exists in a frontmost part of the legacy TTI) exists in 3 symbol periods in a front part of the subframe corresponding to the legacy TTI, the sDCI for the sTTI may be forwarded via the PDCCH region.

Alternatively, as another example, as illustrated in FIG. 9(*a*), when the PDCCH region exists (or is positioned) in a region corresponding to sTTI #0, a method for transmitting (or forwarding) scheduling information for sTTI (i.e., sTTI #0) in the PDCCH region may be considered. That is, if the PDCCH region exists in the sTTI region, the eNB may forward the sDCI for the sTTI to the UE over the PDCCH region configured for the long TTI. In this case, the eNB may forward sDCI for scheduling sTTIs #1 to #5 (i.e., sTTIs not including the PDCCH region) via the sPDCCH region of each sTTI. In such a method, the eNB may configure (or determine) the size of the PDCCH region by considering whether to schedule the UE using the sTTI.

Next, a scheduling method for the sTTI which may be considered in the case of the structure of FIG. 9(*b*) will be described.

In this case, as the PDCCH region is configured wider than that in the case of FIG. 9(*a*), the PDCCH may be used even in some or all operations of the sTTIs (sTTIs #1 to #5) not including the PDCCH. For example, since the sDCI is defined separately for sDCI (i.e., DL sDCI) for DL and sDCI (i.e., UL sDCI) for UL, DL scheduling of sTTI #1 may be performed in the PDCCH region of sTTI #0. In this case, the UE may not monitor DL grant (i.e., DL sDCI) in sTTI #1.

However, when the DCI for the long TTI and the sDCI for the sTTI are all transmitted through the PDCCH region, it may be difficult for the UE using the sTTI (or long TTI) to clearly distinguish which of the DCI and the sDCI is control information for itself. Accordingly, in order to schedule the sTTI (i.e., transmit the control information for the sTTI) by using the PDCCH region as in the methods, a method for distinguishing the DCI and the sDCI in the PDCCH region needs to be considered.

For example, in order to distinguish the DCI and the sDCI in the PDCCH region, a method for partitioning a search space for the DCI and a search space for the sDCI may be considered. In this case, in order to distinguish the search area, the eNB may forward specific offset information for the sDCI to the UE. As an example, when the search space for the DCI is configured as candidate #n through a predefined (or preconfigured) scheme, the eNB may indicate that the search space for the sDCI is configured as candidate #n+3 by forwarding offset information indicating '3' to the UE. In this case, the offset information may be forwarded through higher layer signaling and/or physical layer signaling.

As another example, a method may also be considered in which the same search space is configured for both the long TTI and the sTTI and flag information indicating the DCI for the long TTI or the sDCI for sTTI is added to the DCI and the sDCI. In this case, in order to match the size of the sDCI and the size of the DCI, a padding bit (e.g., zero padding bit) may be added to the sDCI (or DCI). Hereinafter, contents related thereto will be described in detail in a sixth embodiment of this specification.

As yet another example, a method may also be considered in which the eNB separately assigns a radio network temporary identifier (RNTI) for the long TTI and an RNTI for the sTTI to the UE. In this case, the UE may use each RNTI configured for the DCI or sDCI when performing CRC scrambling for the DCI or sDCI and thus distinguish the DCI and the sDCI.

Second Embodiment—Method for Configuring sPDCCH and sPDSCH Regions

Next, in the second embodiment, a method for configuring the sPDCCH region and the sPDSCH region according to the sTTI based radio frame structure when the systems (or radio frame structures) having the TTIs with different lengths coexist will be described.

The eNB and the UE may transmit and receive information by using multiple carriers (or cells) even in the system having the sTTI. In this case, a method for performing inter-cell resource scheduling needs to be considered. Hereinafter, in this specification, for convenience of the description, a cell for scheduling resources of other cells is referred to as a scheduling cell and a cell which is scheduled is referred to as a scheduled cell.

When the sTTI is introduced in the cell, the sPDCCH and the sPDSCH may be transmitted in units of the sTTI. In this case, when the sTTI is configured to be short (e.g., two symbol TTI), allocating the entirety of one symbol for the sPDCCH may act as overhead. Accordingly, a method may be considered in which the remaining regions other than a region where the sDCI is transmitted is used for the sPDSCH in a symbol in which the sPDCCH is transmitted.

For example, if the sDCI is earlier mapped to a front part of a physical resource (i.e., physical resource region) in the symbol where the sPDCCH is transmitted, the eNB may inform the UE a last CCE index and/or a last physical resource index to which the sDCI is mapped. In this case, the UE may receive the sPDSCH through a resource after the last CCE index and/or the last physical resource index of a symbol (i.e., a transmission symbol of the sPDCCH) configured for reception of the sPDCCH.

Alternatively, contrary to this, if the sDCI is earlier mapped to a rear part of the physical resource in the symbol where the sPDCCH is transmitted, the eNB may inform the UE a first CCE index and/or a first physical resource index to which the sDCI is mapped. In this case, the UE may receive the sPDSCH by using a resource before an index indicated by the eNB. Alternatively, when the sDCI is mapped to a middle part of the physical resource in the symbol where the sPDCCH is transmitted, the eNB may notify the UE the first and/or last CCE index or the first and/or last physical resource index to which sDCI is mapped.

Here, the last or first physical resource index may be a last or first PRB index. Alternatively, when the eNB assigns a resource set for the search space to the UE, the last or first physical resource index may be a last or first resource element (RE) index of the resource set.

In this case, since a method of using the physical resource index forwards a resource index (i.e., an absolute resource position index) that may be equally interpreted to all UEs, the method may prevent confusion of the UE as compared with the case of using a CCE index corresponding to a logical resource position index. Specifically, in the case of using the physical resource index, confusion may be prevented, which may occur when the position of the physical resource corresponding to the CCE index mapped to each sPDCCH candidate is configured differently among the UEs.

In this case, information (i.e., resource index information) related to a mapping region of the sDCI as described above may be forwarded through the higher layer signaling and/or physical layer signaling. As an example, when the information indicating the index is forwarded through the physical layer signaling, a new field for the corresponding information may be configured in the sDCI or the corresponding information may be forwarded through the existing field of the sDCI.

In this regard, considering the cross-carrier scheduling between the cells, the sDCI forwarding scheduling information for the scheduled cell is also mapped to the sPDCCH region of the scheduling cell.

Therefore, in case of informing the index information as described above, the eNB of the scheduling cell needs to announce an index for a region to which not only the sDCI that forwards the scheduling information in the scheduling cell but also the sDCI that forwards the scheduling information for other cells are mapped. Such index information may be included in the region of the sDCI for the UE scheduled in the scheduling cell. Here, the region of the sDCI for the UE scheduled in the scheduling cell may refer to a field configured for the UE scheduled in the scheduling cell among fields constituting the sDCI.

Further, in the region of the sDCI that forwards the scheduling information for other cells, index information for the region to which the sDCIs transmitted in the scheduled cell are mapped may be forwarded. Here, the region of the sDCI that forwards the scheduling information for other cells may refer to a field configured for forwarding the scheduling information for other cells among the fields constituting the sDCI.

In this case, the index information may be a logical resource index such as the last and/or first CCE index or an absolute physical resource index such as the last RE index of the resource set for the search space, as described above.

Further, with respect to the cross-carrier scheduling as described above, there may be a case where the length of the TTI between each cell is configured differently as illustrated in FIG. 10.

FIG. 10 illustrates an example of a structure in which lengths of inter-cell TTIs performing cross-carrier scheduling are configured different from each other, to which a method proposed by this specification can be applied. FIG. 10 is just for convenience of the description and does not limit the scope of the present invention.

Referring to FIG. 10, it is assumed that cell #0 is configured to TTI #0 corresponding to 14 symbols and the PDCCH region is located over three symbols in the front part of 14 symbols. Further, it is assumed that cell #1 is configured to 2 symbol TTIs (sTTI #1, sTTI #2, sTTI #3, and sTTI #4) and 3 symbol TTIs (sTTI #0 and sTTI #5) and an sTTI configuration is configured to '2-3-2-2-2-3'.

In this case, when the cross-carrier scheduling is configured to be performed, even though the lengths of the TTIs of respective cells are configured to be different from each other, the cross-carrier scheduling may be configured to be performed in all TTIs. Alternatively, whether to perform separate cross-carrier scheduling may be separately configured with respect to the sTTI.

Further, as illustrated in FIG. 10, when the cross-carrier scheduling is performed between cell #0 and cell #1, if the sTTI is not decoded in time as decoding of the PDCCH transmitted in the scheduling cell (e.g., cell #0), the corresponding sTTI (e.g., specific sTTI of cell #1) may be configured to be dropped.

For example, when cell #0 schedules cell #1, the eNB of cell #0 may forward scheduling information (i.e., sDCI) for cell #1 over the PDCCH region. In this case, in the case of sTTI #0 of cell #1, when decoding of the sDCI forwarded over the PDCCH in cell #0 is delayed, the UE may not obtain control information for the corresponding operation at a UE operation timing in sTTI #0 of cell #1. In this case, the operation for sTTI #0 of cell #1 may be dropped and the UE may be configured to perform the UE operation in a subsequent sTTI.

Further, in addition to the cases described above, a method for utilizing the resources of the sPDCCH for sPDSCH transmission by announcing a rate-matching pattern for the sPDSCH may also be considered. For example, the eNB may be configured to classify a plurality of PRB regions and to rate-match the sPDSCH only for a specific PRB region among the classified PRB regions. In this case, the eNB may forward the information for the configuration to the UE through the higher layer signaling and/or physical layer signaling.

Such an operation may be applied even in the case of the cross-carrier scheduling as it is. In other words, the eNB may transmit rate-matching pattern information for the sPDSCH of the corresponding cell (i.e., another cell to be scheduled) to the UE through the region of the sDCI that forwards the scheduling information for other cells.

Further, a method may also be considered which separately configures and indicates the rate-matching pattern for each symbol in which the control information may be transmitted in the system. That is, with respect to one or symbols in which the control information may be transmitted in the system, the eNB may announce a pattern of a PRB region to which data may be mapped in each symbol. Alternatively, on the contrary, the eNB may notify the pattern of the PRB region to which the control information may be transmitted for each symbol.

Here, the pattern of the PRB region to which the control information may be forwarded may refer to a union of control RB sets of each UE for a plurality of UEs which exist in the system. Here, the control RB set may refer to a resource region constituted by RB(s) configured for transmitting the control channel. In this case, the plurality of UEs may mean all sTTI UEs (i.e., UEs using the sTTI) which exist in the system.

In this case, the eNB may forward (or announce) the information on the rate-matching pattern for each symbol to the UE through the higher layer signaling and/or physical layer signaling.

Of course, the operation may be similarly applied even to the cross-carrier scheduling. For example, the eNB may forward the rate-matching pattern information for each symbol for the symbols to which the control information may be forwarded in the corresponding cell through the region (i.e., a specific field) of the sDCI forwarding the scheduling information for other cells.

Third Embodiment—Method for Configuring sREG and sCCE

Next, in the third embodiment, a method for configuring short REG (sREG) and short CCE (sCCE) depending on the sTTI-based radio frame structure will be described in detail. Here, the sREG may mean a resource element group applied in the sTTI-based radio frame and the sCCE may mean a control channel element applied in the sTTI-based radio frame.

In the case of the sTTI-based radio frame structure, an sTTI having a length shorter than the length of the TTI (i.e., 1 ms TTI) in the legacy LTE system is configured and both a control channel (e.g., sPDCCH) and a data channel (e.g., sPDSCH) are required to be transmitted in an sTTI length of a short unit. In this case, the control channel and the data channel may be multiplexed with each other by a Time Division Multiplexing (TDM) scheme and/or a Frequency Division Multiplexing (FDM) scheme. In this case, a method for configuring the sREG and the sCCE with respect to the sPDCCH of the sTTI is proposed.

When a data region is assigned in units of a resource block (RB) constituted by multiple subcarriers in the frequency domain, the sREG may also be configured (or arranged) based on a minimum assignment unit of the frequency domain in the data region. Such a configuration may be applied only in one symbol or applied over symbols equal to or more than one symbol.

In this case, when the sREG is configured as one symbol, the sREG(s) may be mapped onto the frequency domain according to the number of symbols corresponding to the sTTI length (i.e., frequency first mapping) or first mapped onto the time domain (i.e., time first mapping). For example, in the case of configuring the sREG through a scheme in which the sREG is first mapped onto the time domain, the sREG configuration (or sREG arrangement) may be illustrated in FIG. 11.

FIG. 11 illustrates an example of an sREG configuration to which a method proposed in this specification may be applied. FIG. 11 is just for convenience of the description and does not limit the scope of the present invention.

Referring to FIG. 11, it is assumed that, in a predetermined region, the sREG is mapped first onto the time domain and then onto the frequency domain. Further, it is assumed that a time unit of the sREG is configured to one symbol. As a result, in the case of 8 sREGs, as illustrated in FIG. 11, two sREGs may be first arranged on a time axis and then, two sREGs may be arranged on a next frequency unit. That is, sREGs #0 to #7 illustrated in FIG. 11 may mean 8 sREGs that are numbered in an arrangement order.

In this case, sCCE may correspond to one or more sREGs. In other words, the sCCE may be constituted by one or more sREGs. Further, the sCCE may be configured by a localized mapping scheme or a distributed mapping scheme. For example, when it is assumed that the sCCE is constituted by 4 sREGs, the sCCE may be configured by using sREGs #0, #1, #2, and #3 in order to apply the localized mapping scheme. Unlike this, the sCCE may be configured by using sREGs #0, #1, #6, and #7 in order to apply the distributed mapping scheme. Of course, in the example, the number and the interval of sREGs constituting the sCCE may vary according to the configuration.

Unlike the method, a method for configuring sREG over multiple symbols may also be considered. In this case, the number of symbols configured by the sREG may be equal to the length of the sREG or may be varied within a length range of the sTTI. Here, the length of the sTTI may mean a symbol length corresponding to the sTTI, that is, the number of symbols corresponding to the sTTI.

For example, when the sTTI is constituted by two symbols, the sREG may be configured over two symbols. In this case, the sREG may be configured over two symbols by a minimum allocation unit (e.g., RB) of the frequency domain in the data channel. Alternatively, the sREG may be configured by units acquired by dividing the minimum allocation unit of the frequency domain in the data channel.

As an example, when the minimum allocation unit of the frequency domain in the data channel is configured by 1 RB, that is, a total of 12 subcarriers, the sREG may be configured by a unit extended to several symbols by using six subcarriers. In this case, two sREGs may be configured in an FDMed scheme over several symbols in one RB.

Further, according to the symbol length corresponding to the sTTI length (i.e., sTTI unit), the number of sREGs constituting one sCCE may be differently configured. That is, the control channel element included in the sPDCCH (or constituting the sPDCCH) may include one or more resource element groups and the number of one or more resource element groups may be configured according to the number of symbols corresponding to the sTTI. In this case, the number of sREGs may be configured by considering the aggregation level.

For example, when the sTTI is constituted by two symbols (i.e., 2 symbol TTI), the sCCE may be configured by four sREGs and when the sTTI is constituted by three symbols (i.e., 3 symbol TTI), the sCCE may be configured by three or six sREGs. That is, the number of sREGs corresponding to the sCCE may be configured to a specific number of times of the number of symbols corresponding to the sTTI.

In this case, since multiple sREGs constituting one sCCE may be arranged according to the length of the sTTI, the multiple sREGs may constitute the sCCE in an aligned form without a remained resource. Here, the configuration of the sCCE in the aligned form may mean that the sCCE is configured on the resource region in a rectangular shape or a square shape. The system supporting the STTI has an advantage in that when it is considered that a region to which the control information is to be transmitted is insufficient due to a short transmission unit, the corresponding method may efficiently use resources to transmit the control information. Further, the system has an advantage in that the total number of sCCEs may be equally adjusted (or configured) in each sTTI. Further, as the sCCEs are transmitted in the aligned form as described above, it is advantageous in that the eNB may easily perform an indication for the region to which the data is transmitted when multiplexing data with the control channel and transmitting the multiplexed data to the UE. In other words, complexity (i.e., indication complexity) related to indication of data transmission in the control channel may be reduced due to an aligned structure.

FIG. 12 illustrates examples of an sCCE configuration to which a method proposed by this specification can be applied. FIG. 12 is just for convenience of the description and does not limit the scope of the present invention.

Referring to FIG. 12, it is assumed that the time unit of the sCCE constituting the sPDCCH according to the sTTI-based radio frame structure is configured according to the symbol length corresponding to the sTTI. In this case, the sREGs constituting the sCCE may be mapped first onto the frequency domain or first onto the time domain.

For example, as illustrated in FIG. 12(a), when sTTI #x is constituted by two symbols, each sCCE may be constituted by four sREGs. In this case, n sCCE candidates (sCCE #0 to sCCE #n) may be considered for sPDCCH configuration of sTTI #x and n sCCE candidates may be arranged in the FDM scheme within a predetermined control channel region.

As another example, as illustrated in FIG. 12(b), when sTTI #y is constituted by three symbols, each sCCE may be constituted by six sREGs. In this case, m sCCE candidates (sCCE #0 to sCCE #m) may be considered for sPDCCH configuration of sTTI #y. As in the above-described example, m sCCE candidates may be arranged in the FDM scheme within a predetermined control channel region.

Further, as mentioned above, the control channel (e.g., sPDCCH) for the sTTI may be transmitted based on the DMRS. In this case, considering application of the localized mapping scheme, a random beamforming scheme using only one antenna port for control channel transmission may be applied, or a plurality of antenna ports may be applied. When the plurality of antenna ports are applied, a transmission diversity effect may be acquired.

In addition, when the control channel is transmitted using only one antenna port considering the localized mapping scheme, the UE may select one of a plurality of antennas that may be used for transmission of the control channel.

For example, the UE may select an antenna port corresponding to sCCE having a lowest index among multiple sCCEs configured according to the aggregation level. Specifically, the UE may select an antenna port of a first RE of the sCCE (i.e., lowest index sCCE), an antenna port corresponding to a first PRB in which the sCCE is transmitted, or an antenna port corresponding to first sREG in which the sCCE is transmitted.

The scheme may be applied even when the sREG is transmitted in multiple symbols. If multiple sREGs are transmitted over multiple symbols, the UE may be configured to select an antenna port corresponding to a specific symbol (e.g., a first symbol) and receive the control channel.

In addition, the scheme may be applied even to a case where the distributed mapping scheme is applied and in this case, a diversity transmission method utilizing the plurality of antenna ports may be preferable.

Further, when the sREG is configured (or defined) in units of one symbol in the sTTI, the number of available REs may be differently configured for each sTTI or for each symbol in the sTTI according to whether there is a CRS, a DMRS, and/or a Channel State Information-RS (CSI-RS).

In this case, as in the example of the sREG configuration, the sREG(s) may be first mapped onto the time domain and time bundling may be applied based on the time axis. Through such a scheme, a difference in the number of available REs configured differently for each symbol in the sTTI may be normalized.

However, even though the sREG is configured by the scheme, there may still be the difference in the number of available REs between the sTTIs (or between sTTI symbols). In order to solve the difference, a method may be considered in which the number of sREGs (or REGs) constituting the sCCE (or CCE) is differently configured according to the configuration of the CRS, DMRS, and/or CSI-RS for each sTTI.

For example, when the DMRS is configured with 2 REs per symbol, the number of available REs for each sTTI may be configured to a minimum of 12 to a maximum of 20. Specifically, when the sTTI is 2 symbols and there are 24 REs per 1 RB, a maximum of 20 REs may be available based on 2 symbol sTTIs if no CRS is transmitted in the corresponding sTTI. Unlike, when the sTTI is 2 symbols and there are 24 REs per 1 RB, a maximum of 12 REs may be available based on 2 symbol sTTIs if the CRS (4 REs are required per symbol) is transmitted in the corresponding sTTI. In this case, the sCCE may correspond to 6 sREGs in the sTTI in which the number of available REs is 12 and the sCCE may correspond to 4 sREGs in the sTTI in which the number of available REs is 20.

For example, when the DMRS is configured with 3 REs per symbol, the number of available REs for each sTTI may be configured to a minimum of 10 to a maximum of 18. In this case, the sCCE may correspond to 8 sREGs in the sTTI in which the number of available REs is 10 and the sCCE may correspond to 4 sREGs in the sTTI in which the number of available REs is 18.

In the example, when the sTTI is constituted by three symbols, it is assumed that only two preceding symbols are used as the control channel region, but even when all three symbols are used as the control channel region, the scheme may be applied, of course. In other words, when all three symbols are used as the control channel region, the number of sREGs per sCCE may be configured different from other sTTIs, considering the number of REs available in corresponding sTTI.

Further, as mentioned above, when the sREG is defined in units of one symbol in the sTTI, the number of available REs may be differently configured for each sTTI or for each symbol in the sTTI according to whether there is the CRS, the DMRS, and/or the CSI-RS as described above. In this case, by applying a scheme of first mapping the sREG onto the frequency domain, a plurality of sREGs constituting one sCCE may be configured to be positioned (or confined) within one symbol.

For example, sREG (sREG index i, sREG #i) corresponding to specific sCCE (sCCE index n, sCCE #n) may be given by Equation 1.

$$n \bmod \left\lfloor \frac{N_{sREG}^{symb}}{N_{sREG}^{sCCE}} \right\rfloor + \left\lfloor \frac{N_{sREG}^{symb}}{N_{sREG}^{sCCE}} \cdot N_{sREG}^{symb} + i \cdot \left\lfloor \frac{N_{sREG}^{symb}}{N_{sREG}^{sCCE}} \right\rfloor \right\rfloor \quad \text{[Equation 1]}$$

In Equation 1, $N_{srBC}^{symb}$ may mean the number of sREGs per symbol and $N_{sREG}^{sCCE}$ may mean the number of sREGs per sCCE. Referring to Equation 1, by considering that a value multiplied by i (i.e., sREG index) is a floor value of $N_{sREG}^{symb}/N_{sREG}^{sCCE}$, it can be seen that sREGs are arranged in specific sCCE (i.e., sCCE #n) at the same interval (i.e. an equal interval) in one symbol.

In this case, the number of sREGs constituting the sCCE may be defined (or configured) differently for each symbol. For example, the sCCE may correspond to four sREGs in a symbol in which the CRS is transmitted and the sCCE may correspond to three sREGs in a symbol in which the CRS is not transmitted. In this case, depending on a configured size of the control resource set, some REs may remain in one or both of two symbols.

In this case, the remaining REs may not be used for control channel transmission or the sREG mapped to the corresponding RE may be configured to be used for performing rate-matching. Alternatively, the control resource set may be configured by considering a minimum common multiple of sREG units constituting the sCCE in each symbol so that the remaining RE(s) is not generated as described above.

Further, when multiple sREGs constituting one sCCE are configured to be positioned in one symbol, an sREG interleaver (or REG interleaver) for performing sREG interleaving may be configured for each symbol. Here, the sREG interleaver may mean an equation for performing interleaving for the sREG. That is, interleaving the multiple sREGs positioned in one symbol may be configured to be performed only in the corresponding symbol.

When sCCE indexing is configured after performing interleaving for each symbol, the sCCE index may be numbered through a scheme in which the sCCE index is first configured on the frequency domain and last configured on the time domain (frequency first and time last mapping). For example, a method may be considered in which an sCCE index is allocated by grouping the interleaved sREGs by the number corresponding to the sCCE configuration (or definition) in the first symbol and then, the sCCE index is allocated consecutively in the second symbol.

Through the above-described scheme, the number of sREGs constituting the sCCE may be configured differently depending on which symbol the sCCE index allocated to the UE belongs to through the search space of the UE.

Fourth Embodiment—Method for Configuring Control Channel Region for Coexistence of sTTIs and/or TTIs of Various Units Next, in the fourth embodiment, a method for configuring the control channel region when sTTIs and/or TTIs of various units coexist will be described. As an example, a method for configuring the control channel region for the sTTI when the sTTI is constituted by seven symbols will be described below.

FIG. 13 illustrates another example of a radio frame structure when TTIs having different lengths coexist, to which a method proposed by this specification can be applied. FIG. 13 is just for convenience of the description and does not limit the scope of the present invention.

Referring to FIG. 13, it is assumed that a 14-symbol TTI constituted by 14 symbols, a 7-symbol TTI constituted by 7 symbols, a 3-symbol TTI constituted by 3 symbols and/or a 2-symbol TTI constituted by 2 symbols coexist.

In this case, a method for configuring the control channel for the 7-symbol TTI by the same configuration as the sPDCCH configured in the 2-symbol TTI corresponding to the same timing may be considered. For example, when an sPDCCH region of the sTTI (i.e., sTTI #3 of the 2-symbol TTI) configured in a 2-symbol unit corresponding to a first symbol location of a second sTTI (i.e., sTTI #1 of the 7-symbol TTI) of the sTTI configured in a 7-symbol unit is configured by one symbol, an sPDCCH region of the second sTTI of the sTTI configured in the 7-symbol unit may also be configured by one symbol. Such a scheme may also be applied to a case where the sPDCCH region of the sTTI configured in the 2-symbol unit is constituted by multiple symbols.

Alternatively, a method for configuring the SPDCCH regions of the second sTTI of the sTTI configured in the 7-symbol unit and the sTTI configured in the 2-symbol unit corresponding to the first symbol location not to be associated with each other (i.e., to be different from each other) may also be considered. For example, in the second sTTI of the sTTI configured in the 7-symbol unit, the control channel may be configured similar to the CRC-based PDCCH. Such a method may also be applied between sTTIs (or TTI and sTTI) having various lengths.

Further, a scheme of transmitting control information for the second sTTI (i.e., sTTI #1 of the 7-symbol TTI) together in a PDCCH region included in the first sTTI (i.e., sTTI #0 of the 7-symbol TTI) of the 7-symbol unit sTTI may be considered. Therefore, the eNB may schedule two or more sTTIs in one PDCCH region.

In the case of transmitting the control information for multiple sTTIs in the PDCCH region as described above, the eNB may transmit indication information such as an index indicating on which sTTI the control information is information. Alternatively, like a licensed assisted access (LAA) scheme of the existing LTE system, when the EPDCCH is transmitted in some initial subframes, the eNB may transmit the control information for the second sTTI in the corresponding EPDCCH. In this case, the eNB may be configured to transmit the control information for the first sTTI through the PDCCH region. However, in this case, since overall processing latency may increase, relaxation for an HARQ-ACK timing and/or PUSCH timing may be applied.

Further, in the case of a system supporting the sTTI of the 7-symbol unit, a configuration of a special subframe may be considered. Here, the configuration of the special subframe may mean configurations related to DwPTS, a guard period (GP), and UpPTS constituting the special subframe.

For example, when the special subframe is configured in the second sTTI (e.g., sTTI #1 of the 7-symbol TTI of FIG. 13) of the sTTI configured in the 7-symbol unit, a method for utilizing the DwPTS in the corresponding sTTI may be considered. In this case, the DwPTS may be used for transmitting the information (e.g., control information) on the first sTTI (e.g., sTTI #0 of the 7-symbol TTI of FIG. 13) of the first sTTI and used for transmitting the information (e.g., control information) on the second sTTI.

Further, according to the configuration of the special subframe, the DMRS may not be transmitted in the special subframe. In this case, the corresponding system may not support DMRS based sTTI transmission and may support CRS based sTTI transmission. For example, when a CRS based control channel is transmitted in the second sTTI of the sTTI configured in the 7-symbol unit, the UE may expect transmission of the control channel in addition to CRS based data transmission in the corresponding sTTI.

Fifth Embodiment—Method for Reducing the Number of Blind Decoding Times

Next, in the fifth embodiment, in regard to blind decoding (BD) when TTIs having different lengths coexist, a method for reducing the number of BD attempt times for transmitted sDCI by the UE will be described.

In this regard, a method for aligning the payload sizes of sDCI and DCI may be considered.

In this case, a method for adding padding bits (e.g., zero padding bits) to information having a small payload size among the sDCI or the DCI may be considered. At this time, the method for adding the padding bits may be applied between any type of transmission mode combination (TM combination) between an sTTI operation and a long TTI (i.e., the legacy TTI) operation. For example, TM 4 of the legacy TTI and TM 9 of the sTTI may be configured to have the same payload size using the padding bits.

However, such a method may require a change in the DCI of the legacy TM according to the operation mode of the sTTI. As an example, a field corresponding to 1 bit may be added to the legacy DCI, and a separate sDCI may be designed, or the size may be configured equal through the padding bits.

Sixth Embodiment—Method for Reporting CSI

Next, in the sixth embodiment, a method for reporting channel state information (CSI) when TTIs having different lengths coexist will be described.

When different transmission modes (TM) are configured for different TTIs (e.g., between the sTTI and the legacy TTI), the CSI reporting configuration may be configured differently. Accordingly, it may happen that the UE should perform different types of CSI reporting for different TTIs.

For example, wideband CSI reporting is required in a long TTI (e.g., legacy TTI) and CSI reporting for each subband may be required in the sTTI.

Further, when a TM group is different (i.e., when the TM group for the CSI configuration is different), the eNB may additionally make even the CSI configuration for the sTTI in addition to the CSI configuration for the long TTI. Alternatively, in this case, the CSI reporting may be similarly configured for the sTTI and the long TTI and the TM (or TM group) for the sTTI may be limited according to the TM (or TM group) for the long TTI.

Seventh Embodiment—Method for Configuring Size Depending on Transmission Region of sDCI Next, in the seventh embodiment, a method for configuring the size (i.e., the payload size of sDCI) of the sDCI according to a region in which the sDCI for the sTTI is transmitted will be described.

As described above, the sDCI may be defined (or configured) for an operation in the sTTI and the sDCI may be forwarded through the sPDCCH region for the sTTI. Hereinafter, the method proposed in the embodiment of the present invention is described by assuming that the sPDCCH region for the sTTI is defined, but the present invention is not limited thereto. That is, when the sPDCCH region for the sDCI is not separately defined, the sDCI may be transmitted in a partial resource region of the sTTI region and even in this case, the method proposed in the embodiment of the present invention may also be applied.

However, in the case of the sTTI including the PDCCH region (i.e., the legacy PDCCH region) as described above, the eNB may transmit the sDCI for the sTTI through the PDCCH region. At this time, when the size of the sDCI and the size of the DCI are configured differently, the number of BD attempt times may increase as the UE performs the BD for each payload size. Therefore, in order to reduce the number of blind decoding (BD) times of the UE, a method for configuring the size of the sDCI to be equal to the size of the DCI may be considered.

In this case, in order to distinguish the sDCI and the DCI having the same size from each other, the eNB may be configured to assign a separate RNTI value for the sTTI operation to the UE and the corresponding UE may be configured to use the assigned RNTI value for CRC masking of the sDCI. Alternatively, a method for adding a flag (e.g., 1 bit information) for distinguishing two control information to a specific field of the sDCI and/or DCI may also be considered. In this case, the sDCI may be configured in different formats for each transmission mode (TM) like the DCI and the sizes of the sDCI and the DCI may be configured to be equal to each other for each TM.

Further, the method proposed in this specification is not limited only to a case where the eNB transmits the sDCI through the PDCCH region. For example, the aforementioned method may be, in the same or similar manner, even to a case where control channel regions having different lengths are defined in the wireless communication system and the eNB transmits control information to be transmitted in each region in either one of the control channel regions.

Unlike this, in the case of the sTTI not including the PDCCH region (i.e., the legacy PDCCH region), the eNB may transmit the sDCI through the sPDCCH region. In this case, it may be considered that the DCI is not transmitted and only the sDCI is transmitted in the sPDCCH region and in this case, the method for reducing the number of BD times of the UE may be described like the following example.

For example, the sizes of the sDCI (i.e., DL sDCI) for the DL and the sDCI (i.e., the UL sDCI) for the UL may be configured to be equal to each other. In this case, a separate flag (e.g., 1 bit information) may be added in order to distinguish the DL sDCI and the UL sDCI. In this case, the size of the UL sDCI may be configured to be equal to the size of the DL sDCI defined for each TM and the size of the DL sDCI defined for each TM may be configured to be equal to the size of the DCI of the corresponding TM.

In other words, the sizes of the UL sDCI, the DL sDCI, and the DCI are configured to each to each other for each TM, and as a result, the UL sDCI, the DL sDCI, and the DCI may be transmitted in the PDCCH region and/or the sPDCCH region according to each situation (or condition). In this case, the UL sDCI, the DL sDCI, and/or the DCI may include a flag capable of distinguishing each control information.

Alternatively, the size of the UL sDCI may be configured to be equal to the size of the UL DCI, and the size of the DL sDCI may be configured to be equal to the size of the DL DCI. Even in this case, a specific flag may be included (or added) into a specific field of the sDCI and/or the DCI in order to distinguish the sDCI and the DCI having the same size.

Alternatively, the size of the sDCI may be configured differently according to the sTTI to which the sDCI is transmitted (i.e., according to the symbol length of the sTTI corresponding to the sDCI). However, a criterion for defining the size of the sDCI differently is not limited to the sTTI (i.e., the symbol length of the sTTI). As an example, the size of the sDCI may be set differently according to a slot, a subframe, or a subset thereof.

For example, when the sDCI is transmitted on the sPDCCH (e.g., in the case of the sTTI that does not include the PDCCH region (i.e., the legacy PDCCH region)), the size of the DL sDCI and the size of the UL sDCI are made to be equal to each other through zero Padding, and the like, as described above. At this time, the size of the sDCI may be configured independently of the size of the sDCI transmitted from the PDCCH (e.g., sDCI for the sTTI including the PDCCH region (i.e., the legacy PDCCH region)).

Specifically, in the case of the sDCI transmitted in the sPDCCH region for a specific TM, the DL sDCI and the UL sDCI may be similarly configured to X bits. Further, in the case of the sDCI transmitted in the PDCCH region for a specific TM, the DCI, the DL sDCI, and the UL sDCI corresponding to the corresponding TM may be similarly configured to Y bits. Alternatively, in the case of the sDCI transmitted in the PDCCH region, the DL DCI and the DL sDCI may be configured to Q bits and the UL DCI and the DL sDCI may be configured to P bits. Through such a method, padding of unnecessarily overlapped bits may be prevented and an aggregation level for decoding the control information may be prevented from being unnecessarily configured to a large value.

In addition, a DCI may be defined which includes scheduling information for a channel corresponding to a different TTI length (and/or subcarrier spacing). A rule may be defined such that in a region in which the channel including the DCI having a specific TTI length may be transmitted and a region in which the channel may not be transmitted, DCI sizes of channels including DCIs having different TTI lengths may be determined differently. In this case, the size of the DCI may be a size of a final DCI after an operation such as padding (e.g., zero padding) performed to reduce the number of BD times of the UE (i.e., for adjust the size of the DCI) is performed.

Alternatively, control channels having different TTI lengths may be defined and even in this case, the aforementioned method may be similarly applied.

The size of the DCI referred in this specification may mean the entire size including the zero padding bit(s) in the meaningful control information, but is not so limited. Here, the meaningful control information may mean an original DCI payload to which no zero padding is added.

Eighth Embodiment—Multi-sTTI Scheduling Method

Next, in the eighth embodiment, a method for performing multi-sTTI scheduling will be described. Here, the multi-sTTI scheduling may mean scheduling resources for multiple sTTIs in one sDCI. In a wireless communication system supporting the sTTI, a multi-sTTI scheduling scheme may be considered in order to reduce control overhead.

At this time, consideration may need to be taken for transmission of other channels interlocked with (or associated with) the sDCIs scheduling the multiple sTTIs. For example, when the UE transmits whether sPDSCH transmission (sPDSCH reception in the case of the UE) is successful through the sPUCCH, the resources of the sPUCCH may be interlocked with the index of the sCCE in which the sDCI is transmitted or configured through an acknowledgement resource indicator (ARI) included in the sDCI.

In this case, when the eNB schedules sPDSCH transmission for multiple sTTIs by using one, the sPUCCH resources corresponding to the sTTIs may be fixed to one. In order to prevent the sPUCCH resources from being configured to one, the eNB may configure an offset for each STTI in the UE with respect to the scheduling sTTI through the higher layer signaling.

For example, the sPUCCH resource for the sTTI located at the beginning of the sTTIs to be scheduled together by one sDCI may be interlocked with the sCCE index value of the sDCI or configured through the ARI included in the sDCI. In this case, the eNB may transmit to the UE an offset value for configuring (or changing) the sPUCCH resource for the remaining sTTI(s) through the higher layer signaling.

When the sPUCCH resource index (i.e., a candidate sPUCCH resource index and a candidate resource index to which the sPUCCH is to be transmitted) is configured through the ARI, the eNB may rearrange predetermined resource indexes in order or according to a predefined specific pattern and map the rearranged resource indexes to each sTTI through the higher layer signaling.

As an example, it may be assumed that the eNB schedules four sTTIs by using one sDCI and four candidate sPUCCH resources (sPUCCH resources 0 to #3) are assigned through the higher layer. In this case, when sPUCCH resource #2 is selected through the ARI, the eNB may transmit control information for the first sTTI (i.e., the sTTI positioned at the beginning of the sTTIs to be scheduled together) through sPUCCH resource #2. On the contrary, the eNB may transmit control information for the remaining sTTIs in sPUCCH resources #0, #1, and #3, respectively.

Here, the sTTI to which the sDCI is transmitted or the sPUCCH resource configured through the ARI is applied is not limited to the first sTTI, but may be changed to the sTTI existing at another location, so that the corresponding method may be applied.

At this time, the candidate sPUCCH resource index configured through the higher layer signaling may be rearranged in terms of the order according to a specific pattern and assigned to each sTTI.

Further, the number of candidate sPUCCH resource indexes configured through the higher layer signaling and the number of sTTIs scheduled together may be different from each other.

Specifically, when the number of candidate sPUCCH resource indexes configured through the higher layer signaling is larger than the number of sTTIs to be scheduled together, the eNB may assign the candidate sPUCCH resource indexes to each sTTI by the number of sTTIs in order from the beginning. Alternatively, the eNB may assign the candidate sPUCCH resource indexes, which are rearranged in terms of the order according to a specific pattern defined in the system, to each sTTI by the number of sTTIs in order from the beginning.

Unlike this, when the number of candidate sPUCCH resource indexes configured through the higher layer signaling is smaller than the number of sTTIs to be scheduled together, the eNB may cyclically shift the candidate sPUCCH resource indexes and assign the cyclically shifted candidate sPUCCH resource indexes to each sTTI.

Alternatively, the eNB may cyclically shift and assign the candidate sPUCCH resource indexes, which are rearranged in terms of the order according to a specific pattern defined in the system to each sTTI.

In various embodiments of the present invention described above, for coexistence of the structure supporting the sTTI and the existing LTE system (i.e., legacy LTE system), the length of the sTTI may be configured to be equal to 1 subframe length (i.e., 14 symbols) of the legacy LTE system.

For example, the symbol of the sTTI may be configured in the form of <3, 2, 2, 2, 2, 3> or in the form of <2, 3, 2, 2, 2, 3> by considering the length of the legacy PDCCH region. Here, <3, 2, 2, 2, 2, 3> may mean 3 symbol sTTIs, 2 symbol sTTIs, 2 symbol sTTIs, 2 symbol sTTIs, 2 symbol sTTIs, and 3 symbol sTTIs according to the 14-symbol length. Further, <2, 3, 2, 2, 2, 3> may mean 2-symbol sTTI, 3-symbol sTTI, 2-symbol sTTI, 2-symbol sTTI, 2-symbol sTTI, and 3-symbol sTTI according to the 14-symbol length. In this case, the corresponding sTTI may be differently configured as 2 symbols or 3 symbols according to the index of the sTTI.

At this time, the eNB may configure a control RB set used for transmission of the sPDCCH in each sTTI through the higher layer signaling and/or physical layer signaling. Further, the eNB may also configure the number of symbols for the control RB set. In this case, since the number of symbols constituting each sTTI may be different according to the sTTI index, the number of symbols of the control RB set may be configured differently for the sTTI (i.e., 2 symbol sTTI) constituted by 2 symbols and the sTTI (i.e., 3 symbol sTTI) constituted by 3 symbols.

Further, when the sPDCCH is transmitted, the sPDCCH may be configured as one of CRS-based sPDCCH or DMRS-based sPDCCH. In addition, the sPDCCH may be configured as CRS-based TM or DMRS-based TM.

In this case, unlike the value configured through the higher layer signaling and/or the physical layer signaling, the number of symbols of the control RB set in the specific sTTI may be implicitly assumed, according to a combination of transmission schemes of the sPDCCH and the sPDSCH. For example, when the UE is configured the CRS-based sPDCCH and the DMRS-based TM sPDSCH and the number of symbols in the control RB set is configured to '2', it may be assumed that the UE applies the configuration to the 2-symbol sTTI and the number of symbols of the control RB set for the 3-symbol sTTI is '1'.

FIG. 14 illustrates an operational flowchart of a UE transmitting and receiving data in a wireless communication system supporting a short transmission time interval to which a method proposed by this specification can be applied. FIG. 14 is just for convenience of the description and does not limit the scope of the present invention.

Referring to FIG. 14, the operation of the corresponding UE is described as being used in the wireless communication system supporting the short transmission time interval (sTTI), but the present invention is not limited thereto and may be applied even to the system (e.g., a system supporting a slot and a mini-slot) in which TTIs having different lengths are configured.

In step S1405, the UE receives downlink control information (DCI) through at least one of the PDCCH or the sPDCCH. Here, the PDCCH may be configured according to a first TTI based radio frame structure and the sPDCCH may be configured according to a second TTI based radio frame structure. Further, the downlink control information means downlink control information related to the second TTI. For example, the downlink control information may mean sDCI for the sTTI.

In this case, the number of symbols corresponding to the second TTI (e.g., sTTI) is configured to be smaller than the number of symbols corresponding to the first TTI (e.g., legacy TTI and long TTI).

In this case, the UE may receive the DCI from the eNB by using the method(s) described in various embodiments of the present invention.

Thereafter, in step S1410, the UE receives downlink data through the sPDSCH by using the downlink control information. Here, the sPDSCH is configured according to the second TTI based radio frame structure and the downlink data means downlink data related to the second TTI.

That is, the eNB may perform scheduling for the second TTI (e.g., sTTI) for the UE through the aforementioned procedures.

At this time, the sPDCCH includes a control channel element (CCE) (e.g., sCCE) corresponding to one or more resource element groups (REGs) (e.g., sREGs) and the number of one or more REGs is configured according to the number of symbols corresponding to the second TTI. For example, as described in FIG. 12, the number of sREGs constituting the sCCE may be configured differently according to the length of the sTTI.

Specifically, the one or more REGs may be arranged over at least one symbol corresponding to the second TTI. In this case, the one or more REGs may be FDMed and assigned in units of the number of symbols corresponding to the second TTI.

Further, a symbol length on the time domain of the CCE may be configured to be equal to a symbol length corresponding to the second TTI.

In addition, the number of one or more REGs may be configured to a specific multiple of the number of symbols corresponding to the second TTI.

Further, the one or more REGs may be mapped in an increasing order of an index on the time domain (e.g., time first mapping) and then, mapped in an increasing order of the index on the frequency domain.

In addition, when the resource region of the PDCCH exists in the resource region corresponding to the second TTI, the DCI may be received through the PDCCH. In this case, the size of the DCI may be equal to the size of the DCI related to the first TTI. In this case, the DCI may include one or more zero padding bits added to be equal to the size of the DCI related to the first TTI. For example, when the sDCI is transmitted through the PDCCH, the size of sDCI for the sTTI may be configured to be equal to the size of the DCI for the long TTI and to this end, a zero padding technique may be used.

Alternatively, the DCI may include flag information indicating that the DCI information is related to any one of the first TTI or the second TTI.

Further, when the sPDCCH is received based on a cell-specific reference signal (CRS), the one or more REGs may be assigned to a specific symbol of at least one symbol corresponding to the second TTI. For example, as described above, when the sPDCCH is configured based on the CRS, the sREG(s) constituting one sCCE may be mapped in one symbol and interleaving for the sREG(s) may be performed for each symbol.

Overview of Devices to which Present Invention is Applicable

FIG. 15 illustrates a block diagram of a wireless communication device to which methods proposed by this specification may be applied.

Referring to FIG. 15, a wireless communication system includes an eNB 1510 and multiple UEs 1510 positioned within an area of the eNB 1520.

The eNB 1510 includes a processor 1511, a memory 1512, and a radio frequency (RF) unit 1513. The processor 1511 implements a function, a process, and/or a method which are proposed in FIGS. 1 to 14 above. The layers of the wireless interface protocol may be implemented by the processor 1511. The memory 1512 is connected with the processor 1511 to store various pieces of information for driving the processor 1511. The RF unit 1513 is connected with the processor 1511 to transmit and/or receive a radio signal.

The UE 1520 includes a processor 1521, a memory 1522, and an RF unit 1523.

The processor 1521 implements a function, a process, and/or a method which are proposed in FIGS. 1 to 14 above. The layers of the wireless interface protocol may be implemented by the processor 1521. The memory 1522 is connected with the processor 1521 to store various pieces of information for driving the processor 1521. The RF unit 1523 is connected with the processor 1521 to transmit and/or receive a radio signal.

The memories 1512 and 1522 may be positioned inside or outside the processors 1511 and 1521 and connected with the processors 1511 and 1521 by various well-known means.

As an example, in a wireless communication system supporting a low latency service, the UE may include a radio frequency (RF) unit for transmitting and receiving a radio signal and a processor functionally connected with the RF unit in order to transmit and receive downlink (DL) data.

Further, the eNB 1510 and/or the UE 1520 may have a single antenna or multiple antennas.

FIG. 16 illustrates a block diagram of a communication device according to an embodiment of the present invention.

In particular, FIG. 16 is a diagram more specifically illustrating the UE of FIG. 15 above.

Referring to FIG. 16, the UE may be configured to include a processor (or a digital signal processor (DSP) 1610, an RF module (or RF unit) 1635, a power management module 1605, an antenna 1640, a battery 1655, a display 1615, a keypad 1620, a memory 1630, a subscriber identification module (SIM) card 1625 (this component is optional), a speaker 1645, and a microphone 1650. The UE may also include a single antenna or multiple antennas.

The processor 1610 implements a function, a process, and/or a method which are proposed in FIGS. 1 to 14 above. Layers of a wireless interface protocol may be implemented by the processor 1610.

The memory 1630 is connected with the processor 1610 to store information related to an operation of the processor 1610. The memory 1630 may be positioned inside or outside the processor 1610 and connected with the processor 1610 by various well-known means.

A user inputs command information such as a telephone number or the like by, for example, pressing (or touching) a button on the keypad 1620 or by voice activation using the microphone 1650. The processor 1610 receives such command information and processes to perform appropriate functions including dialing a telephone number. Operational data may be extracted from the SIM card 1625 or the memory 1630. In addition, the processor 1610 may display command information or drive information on the display 1615 for the user to recognize and for convenience.

The RF module 1635 is connected with the processor 1610 to transmit and/or receive an RF signal. The processor 1610 transfers the command information to the RF module 1635 to initiate communication, for example, to transmit radio signals constituting voice communication data. The RF module 1635 is constituted by a receiver and a transmitter for receiving and transmitting the radio signals. The antenna 1640 functions to transmit and receive the radio signals. Upon receiving the wireless signals, the RF module 1635 may transfer the signal for processing by the processor 1610 and convert the signal to a baseband. The processed signal may be converted into to audible or readable information output via the speaker 1645.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

INDUSTRIAL APPLICABILITY

Although a scheme of transmitting and receiving data in a wireless communication system of the present invention has been described with reference to an example applied to a 3GPP LTE/LTE-A system or a 5G system (New RAT system), the scheme may be applied to various wireless communication systems in addition to the 3GPP LTE/LTE-A system or 5G system.

The invention claimed is:

1. A method of transmitting and receiving, by a user equipment, data in a wireless communication system supporting a short transmission time interval (TTI), the method comprising:
receiving, through (i) a physical downlink control channel (PDCCH) depending on a radio frame structure based on a first TTI and (ii) a short PDCCH (sPDCCH) based on a second TTI, downlink control information related to the second TTI,
wherein the number of symbols corresponding to the second TTI is smaller than the number of symbols corresponding to the first TTI, and
wherein (i) a first part of the downlink control information related to the second TTI is received through the PDCCH, and (ii) a second part of the downlink control information related to the second TTI is received through the sPDCCH; and
receiving downlink data related to the second TTI through a short physical downlink shared channel (sPDSCH) depending on the radio frame structure based on the second TTI by using the downlink control information,
wherein the sPDCCH includes a control channel element corresponding to one or more resource element groups, and
wherein the number of one or more resource element groups is configured according to the number of symbols corresponding to the second TTI.

2. The method of claim 1, wherein the one or more resource element groups are disposed over at least one symbol corresponding to the second TTI.

3. The method of claim 2, wherein the one or more resource element groups are frequency division multiplexed and assigned in units of the number of symbols corresponding to the second TTI.

4. The method of claim 1, wherein a symbol length on a time domain of the control channel element is configured to be equal to a symbol length corresponding to the second TTI.

5. The method of claim 1, wherein the one or more resource element groups are mapped an increasing order of an index on the time domain and then, mapped in the increasing order of the index on a frequency domain.

6. The method of claim 1, wherein when the number of symbols corresponding to the second TTI is 2, the number of one or more resource element groups is configured to 4.

7. The method of claim 1, wherein the number of one or more resource element groups is configured to a specific number of times of the number of symbols corresponding to the second TTI.

8. The method of claim 1, wherein the downlink control information related to the second TTI is scheduling multiple short TTIs.

9. The method of claim 8, wherein, based on acknowledgement or negative acknowledgement for sPDSCH being transmitted through a short physical uplink control channel (sPUCCH), a resource of the sPUCCH is linked to an index of a short control channel element that the downlink control information related to the second TTI is transmitted or is configured through an acknowledgement resource indicator (ARI) information included in the downlink control information related to the second TTI.

10. The method of claim 1, wherein based on the sPDCCH being received based on a cell-specific reference signal, the one or more resource element groups are assigned to a specific symbol of at least one symbol corresponding to the second TTI.

11. The method of claim 10, wherein the one or more resource element groups are interleaved in the specific symbol.

12. The method of claim 1, wherein the first TTI is a TTI corresponding to 14 symbols, and
wherein the second TTI is a TTI corresponding to any one of two symbols or three symbols.

13. A user equipment (UE) configured to transmit and receive data in a wireless communication system supporting a short transmission time interval (TTI), the UE comprising:
a transceiver; and
at least one processor functionally connected to the transceiver,
wherein the at least one processor is configured to control the UE to:
receive, through (i) a physical downlink control channel (PDCCH) depending on a radio frame structure based on a first TTI and (ii) a short PDCCH (sPDCCH) based on a second TTI, downlink control information related to the second TTI,
wherein the number of symbols corresponding to the second TTI is smaller than the number of symbols corresponding to the first TTI, and
wherein (i) a first part of the downlink control information related to the second TTI is received through the PDCCH, and (ii) a second part of the downlink control information related to the second TTI is received through the sPDCCH, and
receive downlink data related to the second TTI through a short physical downlink shared channel (sPDSCH)

depending on the radio frame structure based on the second TTI by using the downlink control information,
wherein the sPDCCH includes a control channel element corresponding to one or more resource element groups, and
wherein the number of one or more resource element groups is configured according to the number of symbols corresponding to the second TTI.

* * * * *